US011711842B2

United States Patent
Hosseini et al.

(10) Patent No.: US 11,711,842 B2
(45) Date of Patent: Jul. 25, 2023

(54) AGGREGATION FACTOR ASSOCIATIONS IN UPLINK AND DOWNLINK TRANSMISSIONS

(71) Applicant: QUALCOMM Incorporated, San Diego, CA (US)

(72) Inventors: Seyedkianoush Hosseini, San Diego, CA (US); Wanshi Chen, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/670,666

(22) Filed: Oct. 31, 2019

(65) Prior Publication Data

US 2020/0146022 A1 May 7, 2020

Related U.S. Application Data

(60) Provisional application No. 62/755,411, filed on Nov. 2, 2018.

(51) Int. Cl.
*H04W 72/08* (2009.01)
*H04W 72/542* (2023.01)
(Continued)

(52) U.S. Cl.
CPC ......... *H04W 72/542* (2023.01); *H04L 5/0048* (2013.01); *H04W 24/08* (2013.01); *H04W 72/20* (2023.01); *H04W 72/0446* (2013.01)

(58) Field of Classification Search
CPC ........... H04W 72/085; H04W 72/0406; H04W 72/1289; H04W 72/0446; H04W 72/042;
(Continued)

(56) References Cited

U.S. PATENT DOCUMENTS 8,781,486 B1 * 7/2014 Choi ...................... H04L 5/006
455/450
9,184,806 B2 11/2015 Kim et al.
(Continued)

FOREIGN PATENT DOCUMENTS

TW 201842749 A 12/2018
WO WO-2018175596 A1 9/2018

OTHER PUBLICATIONS

3GPP TS 38.213: "3rd Generation Partnership Project; Technical Specification Group Radio Access Network; NR; Physical Layer Procedures for Control (Release 15)", 3GPP Standard; Technical Specification; 3GPP TS 38.213, 3rd Generation Partnership Project (3GPP), Mobile Competence Centre; 650, Route Des Lucioles; F-06921 Sophia-Antipolis Cedex; France, vol. RAN WG1, No. V15.3.0, Oct. 1, 2018 (Oct. 1, 2018), pp. 1-101, XP051487512, [retrieved on Oct. 1, 2018] section 11.1.1.*chapters 5. 7-7.5. 9.2.2*.
(Continued)

*Primary Examiner* — Man U Phan
(74) *Attorney, Agent, or Firm* — Holland & Hart / Qualcomm

(57) ABSTRACT

Methods, systems, and devices for wireless communications are described. A user equipment (UE) may receive, from a base station, a control signal indicating a resource allocation for either an uplink transmission or a downlink transmission. The UE may identify, based at least in part on a modulation and coding scheme indicated in the control signal, an aggregation factor of the uplink transmission or the downlink transmission. The UE may communicate with the base station by either transmitting the uplink transmission or receiving the downlink transmission in accordance with the resource allocation and the aggregation factor.

26 Claims, 20 Drawing Sheets

(51) Int. Cl.
  *H04L 5/00* (2006.01)
  *H04W 24/08* (2009.01)
  *H04W 72/20* (2023.01)
  *H04W 72/0446* (2023.01)

(58) Field of Classification Search
  CPC ..... H04W 72/08; H04W 72/04; H04W 24/08; H04L 5/003; H04L 5/0048; H04L 5/0094; H04L 5/0078; H04L 5/0051; H04L 5/0091; H04L 5/001; H04L 5/00
  USPC .......................................................... 370/252
  See application file for complete search history.

(56) References Cited

U.S. PATENT DOCUMENTS

| | | | | |
|---|---|---|---|---|
| 10,110,400 | B2* | 10/2018 | Iqbal | H04L 25/03146 |
| 10,298,423 | B2* | 5/2019 | Iqbal | H04B 7/2621 |
| 10,313,163 | B2* | 6/2019 | Iqbal | H04L 25/03159 |
| 10,448,414 | B2* | 10/2019 | Ying | H04L 5/0044 |
| 10,536,972 | B2* | 1/2020 | Kim | H04W 16/14 |
| 10,772,113 | B2* | 9/2020 | Yerramalli | H04L 1/0031 |
| 10,779,289 | B2* | 9/2020 | Myung | H04L 1/1614 |
| 10,779,317 | B2* | 9/2020 | Golitschek Edler von Elbwart | H04W 72/0453 |
| 10,841,942 | B2* | 11/2020 | Abedini | H04W 72/0446 |
| 10,917,905 | B2* | 2/2021 | Zhang | H04W 74/0816 |
| 10,939,441 | B2* | 3/2021 | Bhattad | H04W 74/08 |
| 10,939,458 | B2* | 3/2021 | Kim | H04L 5/0094 |
| 10,952,255 | B2* | 3/2021 | Loehr | H04W 72/14 |
| 11,083,016 | B2* | 8/2021 | Xu | H04W 72/0446 |
| 11,089,585 | B2* | 8/2021 | Xu | H04L 5/0044 |
| 11,122,623 | B2* | 9/2021 | Karaki | H04W 72/23 |
| 11,166,308 | B2* | 11/2021 | Kim | H04W 74/0816 |
| 2016/0330697 | A1* | 11/2016 | Chen | H04W 52/365 |
| 2018/0288746 | A1 | 10/2018 | Zhang et al. | |
| 2019/0261379 | A1 | 8/2019 | Yerramalli et al. | |
| 2020/0028623 | A1 | 1/2020 | Park et al. | |
| 2020/0077428 | A1* | 3/2020 | Zhou | H04W 72/1273 |
| 2020/0106592 | A1* | 4/2020 | Soriaga | H04L 1/1642 |
| 2020/0146056 | A1* | 5/2020 | Kim | H04W 74/0816 |
| 2020/0328839 | A1* | 10/2020 | Zhang | H04L 27/34 |
| 2020/0337064 | A1* | 10/2020 | Kim | H04L 5/0046 |
| 2020/0374933 | A1* | 11/2020 | Lou | H04W 74/0808 |
| 2021/0226742 | A1* | 7/2021 | Wu | H04L 1/1822 |
| 2021/0282185 | A1* | 9/2021 | Xu | H04B 17/318 |
| 2021/0360698 | A1* | 11/2021 | Xu | H04W 72/0446 |
| 2021/0368484 | A1* | 11/2021 | Xu | H04L 1/188 |
| 2022/0038211 | A1* | 2/2022 | Talarico | H04L 1/189 |
| 2022/0070892 | A1* | 3/2022 | Xu | H04W 72/1268 |
| 2022/0086873 | A1* | 3/2022 | Wong | H04L 1/1893 |
| 2022/0132533 | A1* | 4/2022 | Taherzadeh Boroujeni | H04L 5/0094 |
| 2022/0248436 | A1* | 8/2022 | Zhang | H04L 1/1854 |

OTHER PUBLICATIONS

Dahlman E., et al., "4G LTE/LTE-Advanced for Mobile Broadband—Chapter 10", In: "4G LTE/LTE-Advanced for Mobile Broadband—Chapter 10", Mar. 29, 2011 (Mar. 29, 2011), XP055046016, pp. 145-202.

Huawei, et al., "PUSCH Enhancements for URLLC", 3GPP TSG RAN WG1 Meeting #94bis, 3GPP Draft; R1-1811468, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8-Oct. 12, 2018, Sep. 29, 2018 (Sep. 29, 2018), 6 Pages, XP051518871, Retrieved from the Internet: URL: http://www.3gpp.org/ftp/tsg%5Fran/WG1%5FRL1/TSGR1%5F94b/Docs/R1%2D1811468%2Ezip [retrieved on Sep. 29, 2018] section 2.

Partial International Search Report—PCT/US2019/059474—ISA/EPO—dated Jan. 30, 2020 (190362WO).

International Search Report and Written Opinion—PCT/US2019/059474—ISA/EPO—dated Apr. 1, 2020 (190362WO).

NTT DOCOMO, Inc: "Enhanced UL Transmission with Configured Grant for URLLC", 3GPP Draft, R1-1811380, 3GPP TSG RAN WG1 Meeting #94bis, EURLLC UL Grant-Free, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8-Oct. 12, 2018, Sep. 29, 2018 (Sep. 29, 2018), XP051518784, 10 Pages, Retrieved from the Internet: URL:http://www.3gpp.org/ftp/tsg%5Fran/WG1%5FRL1/TSGR1%5F94b/Docs/R1%2D1811380%2Ezip [retrieved on Sep. 29, 2018], Section 1, Section 2, Figures 1, 2.

Huawei, et al., "Overview on Mini-Slot Design", 3GPP TSG RAN WG1 88bis Meeting, R1-1704219, Spokane, USA, Mar. 25, 2017, 8 Pages, Apr. 3-7, 2017.

Taiwan Search Report—TW108139682—TIPO—dated Mar. 2, 2023.

* cited by examiner

Aggregated DL

Aggregated UL

AGGREGATION FACTOR ASSOCIATIONS IN UPLINK AND DOWNLINK TRANSMISSIONS

CROSS REFERENCE

The present Application for Patent claims the benefit of U.S. Provisional Patent Application No. 62/755,411 by HOSSEINI, et al., entitled "AGGREGATION FACTOR ASSOCIATIONS IN UPLINK AND DOWNLINK TRANSMISSIONS," filed Nov. 2, 2018, assigned to the assignee hereof, and expressly incorporated herein.

BACKGROUND

The following relates generally to wireless communications, and more specifically to aggregation factor associations in uplink and downlink transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems typically support a variety of transmission modes. The transmission modes may be configured for uplink transmissions and/or downlink transmissions. As one example, the uplink transmission modes may support a downlink control information (DCI)-based uplink transmission where the DCI (or control) signal configures resources for the uplink transmission. In some aspects, the uplink transmissions may have an associated redundancy requirement to improve reliability of the uplink transmission. Accordingly, the uplink transmission may have an associated aggregation factor (also known as a repetition factor) where the uplink information is transmitted multiple-times over multiple-slots. In this scenario, the resource allocation is generally conveyed in the DCI, and is used in all slots. However, conventional techniques configure the aggregation factor semi-statically. As one example, the aggregation factor is generally signaled in the grant configuring the resources for the uplink transmission. As another example, the aggregation factor may be activation-based, e.g., activating one or more preconfigured resources for the uplink transmission. However, conventional techniques do not provide a mechanism to provide dynamic indication of the aggregation factor, which results in increased resource usage as the aggregation factor (or aggregation level (AL)) must be signaled using one or more bits, fields, and the like.

SUMMARY

The described techniques relate to improved methods, systems, devices, and apparatuses that support aggregation factor associations in uplink and downlink transmissions. Generally, the described techniques provide for various mechanisms that improve aggregated wireless communications. In some aspects, the described techniques provide a mechanism for a control signal (e.g., a downlink control information (DCI) signal) that carries or conveys (explicitly and/or implicitly) an indication of a modulation and coding scheme (MCS) that is linked or otherwise associated with an aggregation factor (or repetition factor) to be used for wireless communications. For example, the DCI may configure or otherwise indicate the MCS to be used for the wireless communications, which implicitly indicates the aggregation factor to be used during the wireless communications. In some aspects, the wireless communications may be uplink or downlink, with the associated user equipment (UE) and/or base station adopting or otherwise implementing the described techniques. For example, a UE may receive the control signal (e.g., DCI) that carries or conveys an indication of a resource allocation for uplink or downlink transmissions and identify, based on the MCS, the aggregation factor to use for the uplink or downlink transmission. The UE may use the resource allocation indicated in the control signal along with the aggregation factor to communicate with the base station, e.g., transmitting uplink transmission to the base station or receiving a downlink transmission from the base station. The base station may identify the aggregation factor to be used for the wireless communications and configure the control signal to indicate the appropriate corresponding MCS.

In some aspects, the described techniques may be used to support indicating the aggregation factor for a grant-less transmission (e.g., an autonomous uplink (AUL) transmission). For example, a plurality of configurations may be available for the UE to use for AUL transmissions. In some aspects, each of the available configurations may have an associated aggregation factor. Accordingly, depending on the aggregation factor that the UE wishes to use during the AUL transmissions, the UE may select one of the configurations and transmit the AUL transmissions according to the selected configuration. Accordingly, the UE selecting a particular configuration for an AUL transmission implicitly carries or conveys an indication of the aggregation factor to be used during the AUL transmission.

In some aspects, the described techniques may also provide a mechanism for improved reference signal repetition during wireless communications. For example, a plurality of configurations may be supported for monitoring repetition-based channel state reference signals. The UE may receive a control signal (e.g., a DCI) that carries or conveys an indication of at least one of the configurations to be used for the UE for monitoring the repetition-based channel state reference signals. As each configuration may be associated with a separate aggregation factor, the UE may identify the aggregation factor based on either the indication provided in the control signal or one of the designated configurations. That is, the UE may select one of the configurations for monitoring repetition-based channel state reference signals from the selected configurations and/or the selected configuration may be overridden in the control signal. Accordingly, the UE may monitor the repetition-based channel state reference signals based on the selected configuration or the configuration indicated in the control signal.

A method of wireless communications at a UE is described. The method may include receiving, from a base station, a control signal indicating a resource allocation for either an uplink transmission or a downlink transmission, identifying, based on a modulation and coding scheme indicated in the control signal, an aggregation factor of the uplink transmission or the downlink transmission, and communicating with the base station by either transmitting the uplink transmission or receiving the downlink transmission in accordance with the resource allocation and the aggregation factor.

An apparatus for wireless communications at a UE is described. The apparatus may include a processor, memory in electronic communication with the processor, and instructions stored in the memory. The instructions may be executable by the processor to cause the apparatus to receive, from a base station, a control signal indicating a resource allocation for either an uplink transmission or a downlink transmission, identify, based on a modulation and coding scheme indicated in the control signal, an aggregation factor of the uplink transmission or the downlink transmission, and communicate with the base station by either transmitting the uplink transmission or receiving the downlink transmission in accordance with the resource allocation and the aggregation factor.

Another apparatus for wireless communications at a UE is described. The apparatus may include means for receiving, from a base station, a control signal indicating a resource allocation for either an uplink transmission or a downlink transmission, identifying, based on a modulation and coding scheme indicated in the control signal, an aggregation factor of the uplink transmission or the downlink transmission, and communicating with the base station by either transmitting the uplink transmission or receiving the downlink transmission in accordance with the resource allocation and the aggregation factor.

A non-transitory computer-readable medium storing code for wireless communications at a UE is described. The code may include instructions executable by a processor to receive, from a base station, a control signal indicating a resource allocation for either an uplink transmission or a downlink transmission, identify, based on a modulation and coding scheme indicated in the control signal, an aggregation factor of the uplink transmission or the downlink transmission, and communicate with the base station by either transmitting the uplink transmission or receiving the downlink transmission in accordance with the resource allocation and the aggregation factor.

In some examples of the method, apparatuses, and non-transitory computer-readable medium described herein, identifying the aggregation factor may include operations, features, means, or instructions for identifying that the modulation and coding scheme indicated in the control signal may be associated with the aggregation factor.

In some examples of the method, apparatuses, and non-transitory computer-readable medium described herein, the aggregation factor may be dynamically indicated via the control signal.

Some examples of the method, apparatuses, and non-transitory computer-readable medium described herein may further include operations, features, means, or instructions for measuring channel quality, determining, based at least on the measured channel quality, a channel quality indicator that may be associated with a quality threshold and a requested aggregation factor, where transmissions to the UE using the requested aggregation factor may be expected by the UE to satisfy the quality threshold, and transmitting the channel quality indicator to the base station, where the modulation and coding scheme indicated in the control signal may be based on the requested aggregation factor associated with the channel quality indicator.

In some examples of the method, apparatuses, and non-transitory computer-readable medium described herein, determining the channel quality indicator may include operations, features, means, or instructions for selecting the channel quality indicator from a table or from a portion of a table whose entries may be each associated with respective aggregation factors.

Some examples of the method, apparatuses, and non-transitory computer-readable medium described herein may further include operations, features, means, or instructions for monitoring for the control signal at predefined symbol locations within a slot or mini-slot, where the predefined symbol locations may be associated with a length of one or more mini-slots in the slot.

In some examples of the method, apparatuses, and non-transitory computer-readable medium described herein, communicating with the base station may include operations, features, means, or instructions for transmitting the uplink transmission or receiving the downlink transmission such that a first symbol of the uplink transmission or downlink transmission may be transmitted or received only at predefined symbol locations within a slot or mini-slot, where the predefined symbol locations may be associated with a length of one or more mini-slots in the slot.

Some examples of the method, apparatuses, and non-transitory computer-readable medium described herein may further include operations, features, means, or instructions for comparing the resource allocation with the predefined symbol locations, and determining to communicate with the base station and in accordance with the resource allocation based on the comparing.

Some examples of the method, apparatuses, and non-transitory computer-readable medium described herein may further include operations, features, means, or instructions for receiving multiple control signals from the base station, each control signal indicating different resource allocations for communications with the base station, determining that the resource allocations from the multiple control signals overlap, and communicating with the base station using the resource allocation from a last of the multiple control signals.

Some examples of the method, apparatuses, and non-transitory computer-readable medium described herein may further include operations, features, means, or instructions for identifying that repetitions of either the uplink transmission or the downlink transmission will span more than one slot, receiving configuration information regarding a future slot to be spanned by the uplink transmission or the downlink transmission, and identifying, based on the configuration information, one or more mini-slots to be used in the future slot for the uplink transmission or the downlink transmission.

Some examples of the method, apparatuses, and non-transitory computer-readable medium described herein may further include operations, features, means, or instructions for identifying that repetitions of either the uplink transmission or the downlink transmission will span more than one slot, decoding a slot format and control region size of a future slot to be spanned by the uplink transmission or the downlink transmission, and identifying, based on the decoding, one or more mini-slots to be used in the future slot for the uplink transmission or the downlink transmission.

Some examples of the method, apparatuses, and non-transitory computer-readable medium described herein may further include operations, features, means, or instructions for identifying a demodulation reference signal configuration to be used in association with the communicating, where the demodulation reference signal configuration may be associated with the aggregation factor.

In some examples of the method, apparatuses, and non-transitory computer-readable medium described herein, identifying the demodulation reference signal configuration may include operations, features, means, or instructions for receiving an indication of the demodulation reference signal configuration in the control signal.

In some examples of the method, apparatuses, and non-transitory computer-readable medium described herein, identifying the demodulation reference signal configuration may include operations, features, means, or instructions for determining the demodulation reference signal configuration based on the aggregation factor.

A method of wireless communications at a UE is described. The method may include identifying multiple configurations available to the UE for autonomous uplink transmissions, each of the multiple configurations being associated with an aggregation factor, selecting one of the multiple configurations for autonomous uplink transmissions, and transmitting the autonomous uplink transmissions in accordance with the selected configuration.

An apparatus for wireless communications at a UE is described. The apparatus may include a processor, memory in electronic communication with the processor, and instructions stored in the memory. The instructions may be executable by the processor to cause the apparatus to identify multiple configurations available to the UE for autonomous uplink transmissions, each of the multiple configurations being associated with an aggregation factor, select one of the multiple configurations for autonomous uplink transmissions, and transmit the autonomous uplink transmissions in accordance with the selected configuration.

Another apparatus for wireless communications at a UE is described. The apparatus may include means for identifying multiple configurations available to the UE for autonomous uplink transmissions, each of the multiple configurations being associated with an aggregation factor, selecting one of the multiple configurations for autonomous uplink transmissions, and transmitting the autonomous uplink transmissions in accordance with the selected configuration.

A non-transitory computer-readable medium storing code for wireless communications at a UE is described. The code may include instructions executable by a processor to identify multiple configurations available to the UE for autonomous uplink transmissions, each of the multiple configurations being associated with an aggregation factor, select one of the multiple configurations for autonomous uplink transmissions, and transmit the autonomous uplink transmissions in accordance with the selected configuration.

In some examples of the method, apparatuses, and non-transitory computer-readable medium described herein, selecting the one of the multiple configurations may include operations, features, means, or instructions for selecting the one of the multiple configurations based on a transport block size, a modulation and coding scheme, a starting symbol for the autonomous uplink transmissions, or combinations thereof.

A method of wireless communications at a UE is described. The method may include identifying multiple configurations for monitoring repetition-based channel state reference signals, receiving a control signal that is indicative of a designated configuration to be used by the UE for monitoring repetition-based channel state reference signals, the designated configuration being one of the multiple configurations, identifying an aggregation factor based on the control signal or the designated configuration, and monitoring repetition-based channel state reference signals based on at least one of the designated configuration or the aggregation factor.

An apparatus for wireless communications at a UE is described. The apparatus may include a processor, memory in electronic communication with the processor, and instructions stored in the memory. The instructions may be executable by the processor to cause the apparatus to identify multiple configurations for monitoring repetition-based channel state reference signals, receive a control signal that is indicative of a designated configuration to be used by the UE for monitoring repetition-based channel state reference signals, the designated configuration being one of the multiple configurations, identify an aggregation factor based on the control signal or the designated configuration, and monitor repetition-based channel state reference signals based on at least one of the designated configuration or the aggregation factor.

Another apparatus for wireless communications at a UE is described. The apparatus may include means for identifying multiple configurations for monitoring repetition-based channel state reference signals, receiving a control signal that is indicative of a designated configuration to be used by the UE for monitoring repetition-based channel state reference signals, the designated configuration being one of the multiple configurations, identifying an aggregation factor based on the control signal or the designated configuration, and monitoring repetition-based channel state reference signals based on at least one of the designated configuration or the aggregation factor.

A non-transitory computer-readable medium storing code for wireless communications at a UE is described. The code may include instructions executable by a processor to identify multiple configurations for monitoring repetition-based channel state reference signals, receive a control signal that is indicative of a designated configuration to be used by the UE for monitoring repetition-based channel state reference signals, the designated configuration being one of the multiple configurations, identify an aggregation factor based on the control signal or the designated configuration, and monitor repetition-based channel state reference signals based on at least one of the designated configuration or the aggregation factor.

In some examples of the method, apparatuses, and non-transitory computer-readable medium described herein, receiving the control signal may include operations, features, means, or instructions for receiving an explicit indication of the designated configuration in the control signal.

Some examples of the method, apparatuses, and non-transitory computer-readable medium described herein may further include operations, features, means, or instructions for identifying the designated configuration based on the aggregation factor.

In some examples of the method, apparatuses, and non-transitory computer-readable medium described herein, monitoring may include operations, features, means, or instructions for monitoring only a number of signals associated with the aggregation factor regardless of a number of repetitions included in the designated configuration.

Some examples of the method, apparatuses, and non-transitory computer-readable medium described herein may further include operations, features, means, or instructions for receiving a signal indicating that the UE may be to combine none, some, or all of the repetition-based channel state reference signals.

A method of wireless communications at a base station is described. The method may include identifying an aggregation factor associated with either an uplink transmission to be received from a UE or a downlink transmission to be transmitted to the UE, transmitting, to the UE, a control signal indicating a resource allocation for either the uplink transmission or the downlink transmission, where the control signal indicates a modulation and coding scheme associated with the aggregation factor, and communicating with the UE by either receiving the uplink transmission or transmitting the downlink transmission in accordance with the resource allocation and the aggregation factor.

An apparatus for wireless communications at a base station is described. The apparatus may include a processor, memory in electronic communication with the processor, and instructions stored in the memory. The instructions may be executable by the processor to cause the apparatus to identify an aggregation factor associated with either an uplink transmission to be received from a UE or a downlink transmission to be transmitted to the UE, transmit, to the UE, a control signal indicating a resource allocation for either the uplink transmission or the downlink transmission, where the control signal indicates a modulation and coding scheme associated with the aggregation factor, and communicate with the UE by either receiving the uplink transmission or transmitting the downlink transmission in accordance with the resource allocation and the aggregation factor.

Another apparatus for wireless communications at a base station is described. The apparatus may include means for identifying an aggregation factor associated with either an uplink transmission to be received from a UE or a downlink transmission to be transmitted to the UE, transmitting, to the UE, a control signal indicating a resource allocation for either the uplink transmission or the downlink transmission, where the control signal indicates a modulation and coding scheme associated with the aggregation factor, and communicating with the UE by either receiving the uplink transmission or transmitting the downlink transmission in accordance with the resource allocation and the aggregation factor.

A non-transitory computer-readable medium storing code for wireless communications at a base station is described. The code may include instructions executable by a processor to identify an aggregation factor associated with either an uplink transmission to be received from a UE or a downlink transmission to be transmitted to the UE, transmit, to the UE, a control signal indicating a resource allocation for either the uplink transmission or the downlink transmission, where the control signal indicates a modulation and coding scheme associated with the aggregation factor, and communicate with the UE by either receiving the uplink transmission or transmitting the downlink transmission in accordance with the resource allocation and the aggregation factor.

In some examples of the method, apparatuses, and non-transitory computer-readable medium described herein, the aggregation factor may be dynamically indicated to the UE via the control signal.

In some examples of the method, apparatuses, and non-transitory computer-readable medium described herein, identifying the aggregation factor may include operations, features, means, or instructions for receiving a channel quality indicator from the UE, where the channel quality indicator may be associated with a requested aggregation factor such that transmissions to the UE using the requested aggregation factor may be expected by the UE to satisfy a quality threshold associated with the channel quality indicator, and setting the aggregation factor to be equal to the requested aggregation factor.

In some examples of the method, apparatuses, and non-transitory computer-readable medium described herein, the channel quality indicator may be from a table or from a portion of a table whose entries may be each associated with respective aggregation factors.

In some examples of the method, apparatuses, and non-transitory computer-readable medium described herein, communicating with the UE may include operations, features, means, or instructions for receiving the uplink transmission or transmitting the downlink transmission such that a first symbol of the uplink transmission or downlink transmission may be received or transmitted only at predefined symbol locations within a slot or mini-slot, where the predefined symbol locations may be associated with a length of one or more mini-slots in the slot.

Some examples of the method, apparatuses, and non-transitory computer-readable medium described herein may further include operations, features, means, or instructions for identifying that repetitions of either the uplink transmission or the downlink transmission will span more than one slot, transmitting configuration information regarding a future slot to be spanned by the uplink transmission or the downlink transmission, and identifying, based on the configuration information, one or more mini-slots to be used in the future slot for the uplink transmission or the downlink transmission.

Some examples of the method, apparatuses, and non-transitory computer-readable medium described herein may further include operations, features, means, or instructions for identifying a demodulation reference signal configuration to be used in association with the communicating, where the demodulation reference signal configuration may be associated with the aggregation factor.

Some examples of the method, apparatuses, and non-transitory computer-readable medium described herein may further include operations, features, means, or instructions for transmitting to the UE an indication of the demodulation reference signal configuration in the control signal.

A method of wireless communications at a base station is described. The method may include identifying multiple configurations available to a UE for autonomous uplink transmissions, each of the multiple configurations being associated with an aggregation factor and receiving the autonomous uplink transmissions in accordance with a configuration of the multiple configurations selected by the UE.

An apparatus for wireless communications at a base station is described. The apparatus may include a processor, memory in electronic communication with the processor, and instructions stored in the memory. The instructions may be executable by the processor to cause the apparatus to identify multiple configurations available to a UE for autonomous uplink transmissions, each of the multiple configurations being associated with an aggregation factor and receive the autonomous uplink transmissions in accordance with a configuration of the multiple configurations selected by the UE.

Another apparatus for wireless communications at a base station is described. The apparatus may include means for identifying multiple configurations available to a UE for autonomous uplink transmissions, each of the multiple configurations being associated with an aggregation factor and receiving the autonomous uplink transmissions in accordance with a configuration of the multiple configurations selected by the UE.

A non-transitory computer-readable medium storing code for wireless communications at a base station is described. The code may include instructions executable by a processor to identify multiple configurations available to a UE for autonomous uplink transmissions, each of the multiple configurations being associated with an aggregation factor and receive the autonomous uplink transmissions in accordance with a configuration of the multiple configurations selected by the UE.

A method of wireless communications at a base station is described. The method may include identifying multiple configurations for monitoring repetition-based channel state reference signals and transmitting a control signal to a UE that is indicative of a designated configuration to be used by the UE for monitoring repetition-based channel state reference signals, the designated configuration being one of the multiple configurations, where at least one of the control signal or the designated configuration being indicative of an aggregation factor.

An apparatus for wireless communications at a base station is described. The apparatus may include a processor, memory in electronic communication with the processor, and instructions stored in the memory. The instructions may be executable by the processor to cause the apparatus to identify multiple configurations for monitoring repetition-based channel state reference signals and transmit a control signal to a UE that is indicative of a designated configuration to be used by the UE for monitoring repetition-based channel state reference signals, the designated configuration being one of the multiple configurations, where at least one of the control signal or the designated configuration being indicative of an aggregation factor.

Another apparatus for wireless communications at a base station is described. The apparatus may include means for identifying multiple configurations for monitoring repetition-based channel state reference signals and transmitting a control signal to a UE that is indicative of a designated configuration to be used by the UE for monitoring repetition-based channel state reference signals, the designated configuration being one of the multiple configurations, where at least one of the control signal or the designated configuration being indicative of an aggregation factor.

A non-transitory computer-readable medium storing code for wireless communications at a base station is described. The code may include instructions executable by a processor to identify multiple configurations for monitoring repetition-based channel state reference signals and transmit a control signal to a UE that is indicative of a designated configuration to be used by the UE for monitoring repetition-based channel state reference signals, the designated configuration being one of the multiple configurations, where at least one of the control signal or the designated configuration being indicative of an aggregation factor.

In some examples of the method, apparatuses, and non-transitory computer-readable medium described herein, transmitting the control signal may include operations, features, means, or instructions for transmitting an explicit indication of the designated configuration in the control signal.

Some examples of the method, apparatuses, and non-transitory computer-readable medium described herein may further include operations, features, means, or instructions for transmitting a signal indicating that the UE may be to combine none, some, or all of the repetition-based channel state reference signals.

DETAILED DESCRIPTION

Figure 1:
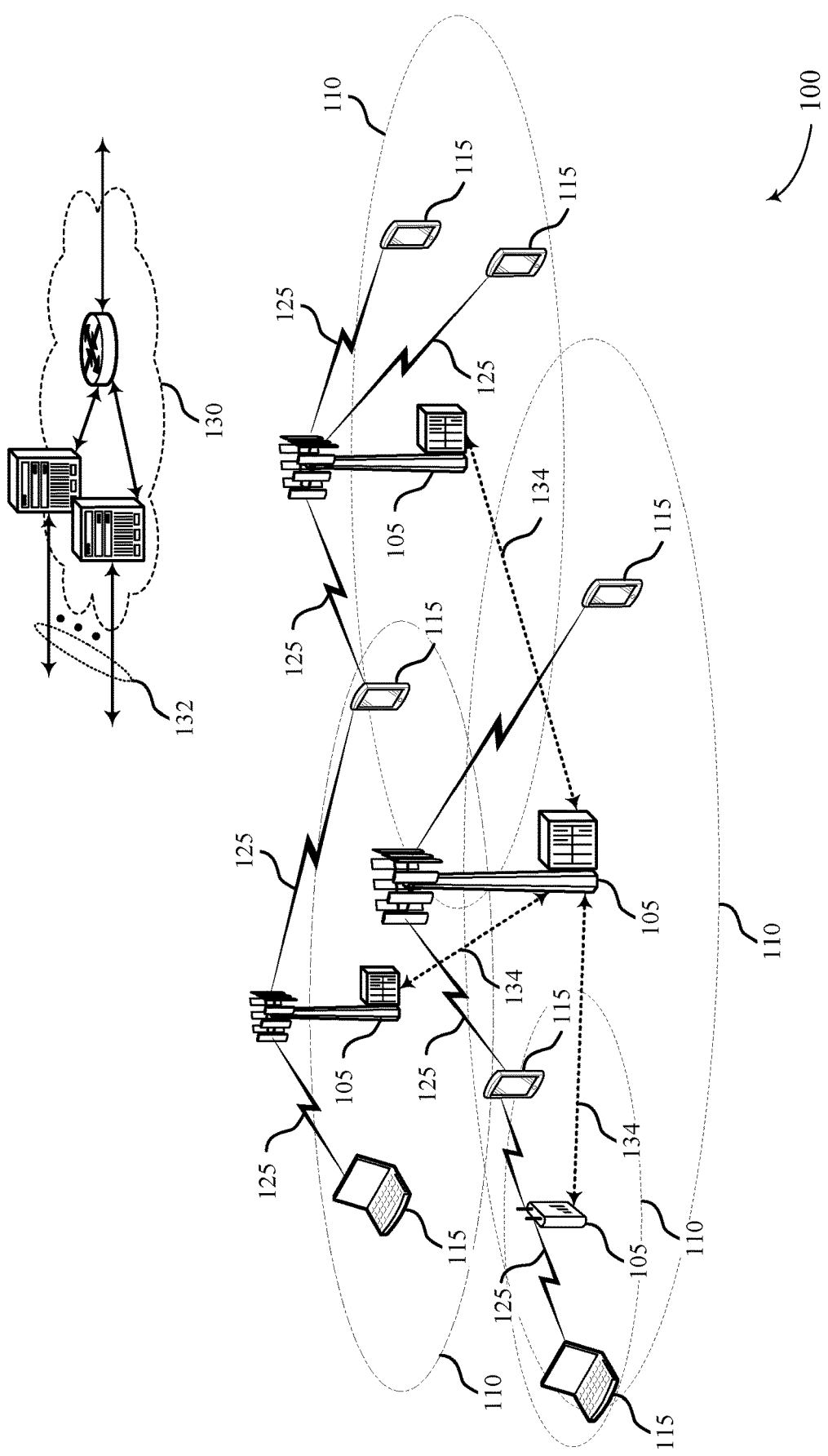
FIG. 1 illustrates an example of a system for wireless communications that supports aggregation factor associations in uplink and downlink transmissions in accordance with aspects of the present disclosure.

Wireless communication systems typically support a variety of transmission modes. The transmission modes may be configured for uplink transmissions and/or downlink transmissions. As one example, the uplink transmission modes may support a downlink control information (DCI)-based uplink transmission where the DCI (or control) signal configures resources for the uplink transmission. In some aspects, the uplink transmissions may have an associated redundancy requirement to improve reliability of the uplink transmission. Accordingly, the uplink transmission may have an associated aggregation factor (also known as a repetition factor) where the uplink information is transmitted multiple-times over multiple-slots. In this scenario, the resource allocation is generally conveyed in the DCI, and is used in all slots. However, conventional techniques configure the aggregation factor semi-statically. As one example, the aggregation factor is generally signaled in the grant configuring the resources for the uplink transmission. As another example, the aggregation factor may be activation-based, e.g., activating one or more preconfigured resources for the uplink transmission. However, conventional techniques do not provide a mechanism to provide dynamic indication of the aggregation factor, which results in increased resource usage as the aggregation factor (or aggregation level (AL)) must be signaled using one or more bits, fields, and the like.

Aspects of the disclosure are initially described in the context of a wireless communications system. The described techniques relate to improved methods, systems, devices, and apparatuses that support aggregation factor associations in uplink and downlink transmissions. Generally, the described techniques provide for various mechanisms that improve aggregated wireless communications. In some aspects, the described techniques provide a mechanism for a control signal (e.g., a downlink control information (DCI) signal) that carries or conveys (explicitly and/or implicitly) an indication of a modulation and coding scheme (MCS) that is linked or otherwise associated with an aggregation factor (or repetition factor) to be used for wireless communications. For example, the DCI may configure or otherwise indicate the MCS to be used for the wireless communications, which implicitly indicates the aggregation factor to be used during the wireless communications. In some aspects, the wireless communications may be uplink or downlink, with the associated user equipment (UE) and/or base station adopting or otherwise implementing the described techniques. For example, a UE may receive the control signal (e.g., DCI) that carries or conveys an indication of a resource allocation for uplink or downlink transmissions and identify, based on the MCS, the aggregation factor to use for the uplink or downlink transmission. The UE may use the resource allocation indicated in the control signal along with the aggregation factor to communicate with the base station, e.g., transmitting an uplink transmission to the base station or receiving a downlink transmission from the base station. The base station may identify the aggregation factor to be used for the wireless communications and configure the control signal to indicate the appropriate corresponding MCS.

In some aspects, the described techniques may be used to support indicating the aggregation factor for a grant-less transmission (e.g., an autonomous uplink (AUL) transmission). For example, a plurality of configurations may be available for the UE to use for AUL transmissions. In some aspects, each of the available configurations may have an associated aggregation factor. Accordingly, depending on the aggregation factor that the UE wishes to use during the AUL transmissions, the UE may select one of the configurations and transmit the AUL transmissions according to the selected configuration. Accordingly, the UE selecting a particular configuration for an AUL transmission implicitly carries or conveys an indication of the aggregation factor to be used during the AUL transmission.

In some aspects, the described techniques may also provide a mechanism for improved reference signal repetition during wireless communications. For example, a plurality configurations may be supported for monitoring repetition-based channel state reference signals. The UE may receive a control signal (e.g., a DCI) that carries or conveys an indication of at least one of the configurations to be used for the UE for monitoring the repetition-based channel state reference signals. As each configuration may be associated with a separate aggregation factor, the UE may identify the aggregation factor based on either the indication provided in the control signal or one of the designated configurations. That is, the UE may select one of the configurations for monitoring repetition-based channel state reference signals from the selected configurations and/or the selected configuration may be overridden in the control signal. Accordingly, the UE may monitor the repetition-based channel state reference signals based on the selected configuration or the configuration indicated in the control signal.

Aspects of the disclosure are further illustrated by and described with reference to apparatus diagrams, system diagrams, and flowcharts that relate to aggregation factor associations in uplink and downlink transmissions.

FIG. 1 illustrates an example of a wireless communications system 100 that supports aggregation factor associations in uplink and downlink transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115 may receive, from a base station 105, a control signal indicating a resource allocation for either an uplink transmission or a downlink transmission. The UE 115 may identify, based at least in part on a modulation and coding scheme indicated in the control signal, an aggregation factor of the uplink transmission or the downlink transmission. The UE 115 may communicate with the base station 105 by either transmitting the uplink transmission or receiving the downlink transmission in accordance with the resource allocation and the aggregation factor.

In some aspects, a UE 115 may identify multiple configurations available to the UE for autonomous uplink transmissions, each of the multiple configurations being associated with an aggregation factor. The UE 115 may select one of the multiple configurations for autonomous uplink transmissions. The UE 115 may transmit the autonomous uplink transmissions in accordance with the selected configuration.

In some aspects, a UE 115 may identify multiple configurations for monitoring repetition-based channel state reference signals. The UE 115 may receive a control signal that is indicative of a designated configuration to be used by the UE for monitoring repetition-based channel state reference signals, the designated configuration being one of the multiple configurations. The UE 115 may identify an aggregation factor based at least in part on the control signal or the designated configuration. The UE 115 may monitor repetition-based channel state reference signals based at least in part on at least one of the designated configuration or the aggregation factor.

In some aspects, a base station 105 may identify an aggregation factor associated with either an uplink transmission to be received from a UE 115 or a downlink transmission to be transmitted to the UE 115. The base station 105 may transmit, to the UE 115, a control signal indicating a resource allocation for either the uplink transmission or the downlink transmission, wherein the control signal indicates a modulation and coding scheme associated with the aggregation factor. The base station 105 may communicate with the UE 115 by either receiving the uplink transmission or transmitting the downlink transmission in accordance with the resource allocation and the aggregation factor.

In some aspects, a base station 105 may identify multiple configurations available to a UE 115 for autonomous uplink transmissions, each of the multiple configurations being associated with an aggregation factor. The base station 105 may receive the autonomous uplink transmissions in accordance with a configuration of the multiple configurations selected by the UE 115.

In some aspects, a base station 105 may identify multiple configurations for monitoring repetition-based channel state reference signals. The base station 105 may transmit a control signal to a UE 115 that is indicative of a designated configuration to be used by the UE 115 for monitoring repetition-based channel state reference signals, the designated configuration being one of the multiple configurations, wherein at least one of the control signal or the designated configuration being indicative of an aggregation factor.

Figure 2:
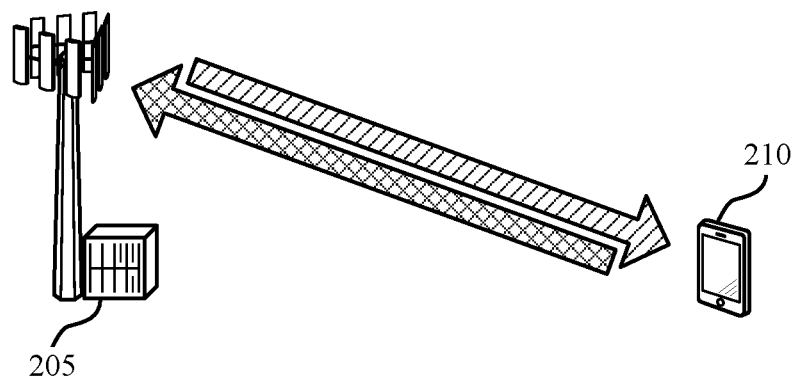
FIG. 2 illustrates an example of a wireless communication system that supports aggregation factor associations in uplink and downlink transmissions in accordance with aspects of the present disclosure.
Figure 2:
Figure 2:

FIG. 2 illustrates an example of a wireless communication system 200 that supports aggregation factor associations in uplink and downlink transmissions in accordance with aspects of the present disclosure. In some examples, wireless communication system 200 may implement aspects of wireless communications system 100. Generally, wireless communications system 200 may include a base station 205 and UE 210, which may be examples of corresponding devices described herein. Generally, base station 205 may be considered a serving base station from the perspective of UE 210.

In some aspects, wireless communication system 200 may be configured to support various communication modes between base station 205 and UE 210. In some examples, the communication modes may include uplink communications from UE 210 to base station 205 and/or downlink communications from base station 205 to UE 210. In some aspects, wireless communications may be DCI-based where a control signal (e.g., DCI) carries or conveys the resources for the wireless communications. In some aspects, wireless communications may be aggregated. For example, wireless communication system 200 may support aggregated uplink communications and/or aggregated downlink communications.

In some aspects, aggregated communications generally include the uplink information and/or downlink information (e.g., such as a TB) being sent multiple times over multiple slots. Generally, the resource allocation (e.g., time, frequency, and/or spatial resource) is generally carried or conveyed in the DCI and is used in each slot. Aggregated communications typically have an associated aggregation factor that indicates the number of times that transmission of the information is to be repeated. In some aspects, the aggregation factor may also be considered a repetition factor for the wireless communications. Conventionally, the aggregation factor may be semi-statically configured and/or may be initiated by the DCI (e.g., dynamic). In some aspects, wireless communications may be grant-free communications, such as AUL communications. Within the context of a grant-free communications, conventional techniques may include a mode 1 where the grant for the AUL transmissions also signals or otherwise conveys the indication of the aggregation factor or a mode 2 where the resources for the AUL transmissions are preconfigured, but are activation-based, e.g., activated in the DCI. Aspects of the described techniques provide various techniques that improve or otherwise enhance any of the described communication modes.

In a first enhancement, aspects of the described techniques provide for dynamic indication of the aggregation factor. Within the context of dynamic wireless communications with repetition and/or for an activation-based AUL transmission, conventional techniques include a particular bit or field in the DCI that carries or conveys the indication of the aggregation factor. However, this approach increases the size of the DCI, which requires additional resources to be used.

Some aspects of the described techniques provide a mechanism to implicitly signal or otherwise convey an aggregation factor to be used for wireless communications. Generally, these techniques may include associating or otherwise having one or more of the parameters to be used for the wireless communications associated with a particular aggregation factor. As one non-limiting example, different MCS values or indices may be associated with different aggregation factors. For example, a first MCS may be associated with a first aggregation factor, a second MCS may be associated with a second aggregation factor, and so forth. Accordingly, the wireless devices (such as base station 205 and/or UE 210) may each be configured such that, for each MCS, the corresponding aggregation factor is known beforehand. Accordingly, selecting or otherwise using a particular MCS may also carry or convey an implicit indication that a particular aggregation factor is to be used for the wireless communications.

As one example in an uplink scenario, base station 205 may select resources (e.g., time, frequency, spatial, and the like) as well as various communication parameters for the uplink transmission. In some aspects, base station 205 may know or otherwise determine which aggregation factor is to be used for the uplink transmissions and select a corresponding MCS value as one of the communication parameters. Accordingly, base station 205 may configure a control signal (e.g., a DCI) to carry or otherwise convey an indication of the resource grant or allocation as well as an indication of the various communication parameters (including the selected MCS). UE 210 may receive the control signal and identify, based on the MCS, the aggregation factor to be used for the uplink transmission. For example, UE 210 may access a look up table or other configured set of information to determine which aggregation factor is associated with the indicated MCS. Accordingly, UE 210 may transmit the uplink transmissions to base station 205 using the indicated resource allocations and communication parameters, with the aggregation factor for the uplink transmission being based on the indicated MCS.

As another example and for downlink communications, base station 205 may select resources as well as various communication parameters for the downlink transmissions. Base station 205 may know or otherwise determine the aggregation factor to be used for the downlink transmission and select a particular MCS that corresponds to that aggregation factor. Base station 205 may transmit a control signal to UE 210 that carries or conveys the indication of the resource allocation as well as the communication parameters (including the MCS). UE 210 may receive the control signal and use the indicated MCS to determine which aggregation factor will be used for the downlink transmission. The base station 205 may perform the downlink transmission to UE 210 using the indicated resources and according to the aggregation factor.

In some aspects, the available MCS values may be based at least in part on the number of available aggregation factors. For example, UE 210 may support various aggregation factors in order to meet certain redundancy or reliability requirements. In some aspects, this may include a particularly high redundancy or reliability requirement being associated with a lower MCS values (e.g., reliability may be favored over throughput). Accordingly, in some aspects high MCS values may be removed from the available MCS values (e.g., MCS tables), with lower MCS value(s) being added. In some aspects, each of the new lower MCS values may be associated with or otherwise correspond to a particular aggregation factor. In some aspects, a new MCS table may be used, with the MCS values in the new MCS table being associated with corresponding aggregation factors.

In some aspects, dynamically signaling the aggregation factor in the DCI (either implicitly or explicitly) may provide a mechanism to dynamically change the aggregation factor for wireless communications. In the context of an AUL transmission, aspects of the described techniques provide a mechanism to dynamically change the aggregation factor. For example, UE 210 may be configured with a plurality of configurations to use for AUL transmissions. Generally, each AUL configuration may have an associated or corresponding aggregation factor. Accordingly, UE 210, by selecting a particular configuration to use for an AUL transmission, may implicitly select the aggregation factor to be used for the AUL transmission. For example, UE 210 may select a first configuration that corresponds to a first aggregation factor and perform the AUL transmission according to the first configuration with the corresponding first aggregation factor. In some aspects, UE 210 may select the configuration based on a variety of factors, e.g., based on a transport block size, the MCS, a starting symbol for the AUL transmission, and the like. Accordingly, base station 205 may receive the AUL transmission on a configured set of resources (e.g. according to the configuration selected by UE 210) and identify or otherwise determine the aggregation factor to be used during the AUL transmission based on the configured set of resources.

In some aspects, the described techniques may be used to improve channel performance reporting by UE 210 when aggregation is implemented. For example, in some examples repetition may be used at a lower spectral efficiency. Conventional techniques, however, do not provide for the UE to consider repetition or aggregation when calculating its channel performance (e.g., channel quality indicator (CQI)). However, aspects of the described techniques provide a mechanism by which UE 210 may use repetition or aggregation when computing its CQI, in order to provide a more useful channel performance report to base station 205. In some examples, this may include one or more new entries being provided in a CQI table, with each new entry being associated with a particular aggregation factor. The new entries may be added to the current CQI tables (e.g., by removing some indices associated with higher special efficiencies) or by implementing a new CQI table. Accordingly, UE 210 may measure the channel quality and determine, based on the channel quality, a CQI that is associated with the quality threshold and requested aggregation factor. Generally, transmissions from base station 205 the UE 210 using the requested aggregation factor may be expected or otherwise configured to satisfy the quality threshold. In some aspects, UE 210 may transmit the CQI to the base station 205, with the MCS indicated in the control signal corresponding to the requested aggregation factor associated with the CQI.

In some aspects, the described techniques may be used to improve reference signal repetition during a wireless communication. For example, when repetition or aggregation is adopted in a downlink transmission, the corresponding reference signal (e.g., channel state information reference signal (CSI-RS)) may also be repeated. According to conventional techniques, within downlink slot aggregation, the control signal (e.g., DCI) may only be able to trigger the CSI-RS over the allocation in the first slot. This approach, however, is impractical in the situation where the downlink transmission has an aggregation factor of greater than one.

Accordingly, aspects of the described techniques provide improved mechanisms to support signaling repeated reference signal information for use during a downlink transmission. In some aspects, multiple configurations (e.g., CSI-RS configurations) may be supported for UE 210. In some aspects, each configuration may be associated with UE 210 monitoring repetition-based channel state reference signals (e.g., CSI-RSs). In some aspects, each configuration may be associated with or otherwise correspond to a particular aggregation factor. As one example, if the aggregation factor is set to 4, one of the available configurations may include resources or other information to support the reference signals and for repetition instances. In some aspects, the particular configuration to be used by UE 210 may be explicitly signaled in the DCI and/or implicitly indicated based on the aggregation factor.

In some aspects, the configurations for monitoring the repetition-based channel state reference signals may have a fixed length, e.g., may be based on the maximum aggregation factor. As one example, if the aggregation factor that is signaled is smaller than the maximum aggregation factor, UE 210 may use the information for the first few (e.g., the signaled aggregation factor) CSI-RS configurations. That is, if the CSI-RS information is given for 6 repetition instances, but the signal aggregation factor is for four, the information for the first 4 instances of the repetition may be used.

In some aspects, based on the signaling, the CSI-RSs in different repetition instances can either be used for coherent channel estimation or non-coherent channel estimation. For example, coherent combining may be useful in the low mobility scenarios, whereas non-coherent may be more suitable for high mobility scenarios. Within each repetition window, all CSI-RSs may be signaled to be combined, not combined, or only a subset of the CSI-RSs may be combined.

Thus, UE 210 may determine or otherwise identify the configurations available for monitoring the repetition-based channel state reference signals. UE 210 may then receive a control signal that carries or conveys or is otherwise associated with the designated configuration to be used by UE 210 for monitoring the repetition-based channel state reference signals. UE 210 may identify or otherwise select an aggregation factor based on the control signal or based on the designated configuration. UE 210 may monitor the repetition-based channel state reference signals according to the designated configuration and/or the aggregation factor.

In some aspects, the described techniques may improve aspects of repetition or aggregation in the context of minislots. As discussed, aggregated wireless communications may take place using the same resources in different slots. Aspects of the described techniques enable such repetition at the mini-slot level, such as enabling repetitions to potentially take place in one slot, with the possibility of crossing the slot boundary.

As one nonlimiting example, using uplink type B configurations, a transport block may be scheduled in any symbol. For example, if only 5 symbols remain in the current slot and the transport block needs 6 symbols, and then using two-symbol mini slots, the options are 2+2+1 (which is not enough) or 2+2+blank+2 (with the last 2 symbols occurring in the next slot). In some aspects, it is desirable to avoid the orphan symbol (e.g., 2+2+1+1) for wireless communications. In some aspects, this may be achieved according to the described techniques using different options (either alone or in combination). A first option may include restricting the monitoring occasion (e.g., when UE 210 monitors for a control signal, such as a DCI, from base station 205) to predefined locations, e.g., once every 2 symbols for repetition within a 2-symbol mini slot. In another option, the monitoring occasions may not be protected, but the first symbol of the repetition bundle may only be allowed to start at some given locations. In some aspects, the given locations may be a function of the mini slot length. In some aspects, options one and two may be performed for a mini-slot configuration or configurations having any number of available symbols.

In some aspects, UE 210 may be asked to follow the behavior for the first option or the second option for different mini-slot links simultaneously, e.g., uplink transmissions with repetition and 2-symbol mini-slots and 7-symbol mini-slots. If UE 210 detects DCIs with their associated uplink transmissions overlapping, this may be interpreted as either an error case or as base station 205 overriding its first decision, e.g., the second DCI should be followed by UE 210.

In the instance where the repetitions cross the slot boundary, different options may be followed. In a first option, UE 210 is informed about the control region size of the next slot and the slot format of the next slot so that the mini-slot can be predetermined for the next slot (or slots). In a second option, UE 210 may determine the mini-slots for the next slot only after decoding the slot format and the control region size of the next slot.

In some aspects, the described techniques may provide for improved reference signal sharing for uplink transmission repetition. For example, multiple reference signal configurations (e.g., demodulation reference signal (DMRS) configurations) may be defined (e.g., signaled via RRC, MAC CE, and the like). In some aspects, each reference signal configuration may be associated with a particular aggregation factor. One of the reference signal configurations may be signaled by the DCI explicitly or could be implicitly indicated via the aggregation factor. Accordingly, UE 210 may be able to identify the aggregation factor based on the DMRS pattern configuration (e.g., reference signal configuration) conveyed by base station 205 and a control signal (e.g., the DCI). In some aspects, the indication may be similar to the indication discussed with respect to the CSI-RS features, e.g., either multiple configurations with different lengths, or multiple configurations with the length of the maximum aggregation factor supported.

Figure 3:
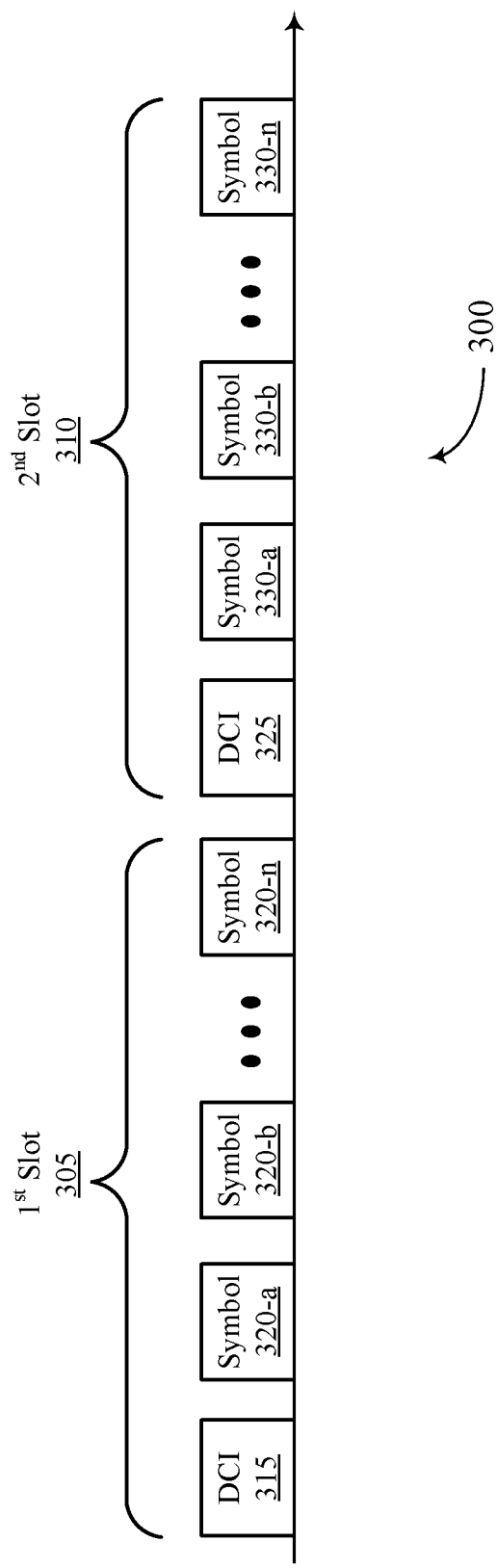
FIG. 3 illustrates an example of a slot configuration that supports aggregation factor associations in uplink and downlink transmissions in accordance with aspects of the present disclosure.

FIG. 3 illustrates an example of a slot configuration 300 that supports aggregation factor associations in uplink and downlink transmissions in accordance with aspects of the present disclosure. In some examples, slot configuration 300 may implement aspects of wireless communication systems 100 and/or 200. Aspects of slot configuration 300 may be implemented by a base station and/or UE, which may be examples of corresponding devices described herein.

In some aspects, slot configuration 300 illustrates an example of aggregated communications where the same information (e.g., a transport block) is communicated across a plurality of slots. For example, slot configuration 300 includes a first slot 305 and a second slot 310. The first slot 305 and the second slot 310 may each include a plurality of symbols, with n symbols being shown by way of example only. In some aspects, the first slot 305 may include a first symbol 315 that carries or conveys a control signal (e.g., a DCI) and then a plurality of additional symbols 320 that may carry or convey data. Similarly, the second slot 310 may include a first symbol 325 that carries or conveys a control signal (e.g., a DCI) and then a plurality of additional symbols 330 that may carry or convey data.

In some aspects, wireless communications may be configured to support aggregation where the same information is transmitted across one or more symbols of a plurality of slots. Generally, a control signal (e.g., the DCI conveyed during the first symbol 315 of the first slot 305) may configure or otherwise activate aggregated wireless communications between a base station and the UE. Broadly, the aggregation factor (or AL) may generally be considered the number of times of the information is transmitted. The wireless communications may refer to the uplink communications and/or downlink communications that are configured or otherwise activated by the control signal. In some aspects, the control signal may carry or convey an indication of resources to be used for the wireless communications (e.g., time, frequency, spatial, and the like, resources). As one non-limiting example, a control signal carried in the first symbol 315 of the first slot 305 may configure wireless communications using resources corresponding to symbol 320-a and 320-b of the first slot 305, with the same information being repeated in symbol 330-a and symbol 330-b of the second slot 310. Other configurations of the symbols 320 and/or 330 may also be configured or otherwise activated for the wireless communications. In this example, the aggregation factor would be considered two.

In some aspects, the described techniques provide a mechanism whereby an indication of the aggregation factor is implicitly conveyed in the control signal. For example, a base station may configure a control signal to carry or convey an indication of an aggregation factor being used for the wireless communications (e.g., uplink communications and/or downlink communications). In some aspects, this may include the control signal carrying or conveying an indication of an MCS to be used for the wireless communications. The base station and UE may know that the MCS is associated with or otherwise corresponds to a particular aggregation factor. Accordingly, the control signal conveying an indication of a MCS (as well as of the resources being allocated for the transmission) implicitly conveys an indication of the aggregation factor to be used for the wireless communications. Therefore, the UE may use the indication of the MCS to identify the aggregation factor and communicate with a base station in accordance with the resources allocated in the control signal and the identified aggregation factor.

Figure 4:
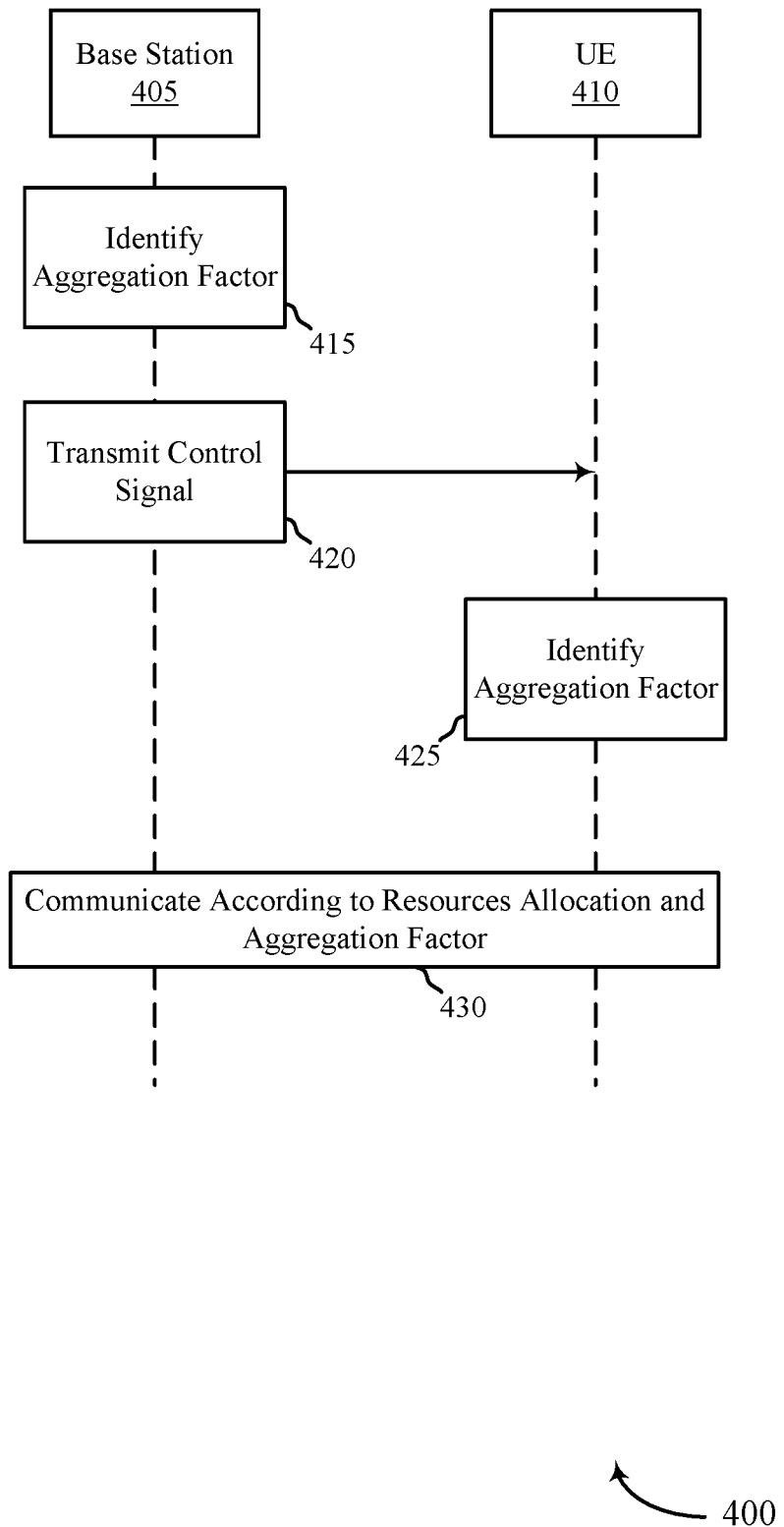
FIG. 4 illustrates an example of a process that supports aggregation factor associations in uplink and downlink transmissions in accordance with aspects of the present disclosure.

FIG. 4 illustrates an example of a process 400 that supports aggregation factor associations in uplink and downlink transmissions in accordance with aspects of the present disclosure. In some examples, process 400 may implement aspects of wireless communication systems 100, 200 and/or slot configuration 300. Aspects of process 400 may be implemented by a base station 405 and/or UE 410, which may be examples of corresponding devices described herein.

At 415, base station 405 may identify an aggregation factor associated with either an uplink transmission to be received from UE 410 or downlink transmission to be transmitted to UE 410. Generally, the aggregation factor may refer to the number of times that a particular piece of information (e.g., a transport block) is to be communicated between the base station 405 and the UE 410. Broadly, the higher the aggregation factor, the more reliable the communications.

At 420, base station 405 may transmit (and UE 410 may receive) a control signal indicating a resource allocation for each of the uplink transmission of the downlink transmission. In some aspects, the control signal may indicate a MCS to be used for the uplink transmission for the downlink transmission, with the MCS being associated with an aggregation factor. In some aspects, the control signal may dynamically indicate the aggregation factor. In some aspects, UE 410 may monitor for the control signal at predefined symbol locations within a slot (or mini-slot). In some aspects, the predefined symbol locations may be associated with the length of one or more mini-slots in the slot.

At 425, UE 410 may identify, based at least in part on the MCS indicated in the control signal, the aggregation factor of the uplink transmission or the downlink transmission. In some aspects, this may include UE 410 identifying that the MCS indicated in the control signal is associated with the aggregation factor.

At 430, base station 405 and UE 410 may communicate by transmitting the uplink transmission from UE 410 to base station 405 or receiving the downlink transmission from base station 405 to UE 410 in accordance with the resource allocation and the aggregation factor.

In some aspects, this may include UE 410 transmitting (and base station 405 receiving) an uplink transmission or base station 405 transmitting (and UE 410 receiving) the downlink transmission such that a first symbol of the uplink transmission or the downlink transmission is transmitted or received in predefined symbol locations within a slot or mini-slot. In some aspects, the predefined symbol locations may be associated with the length of one or more mini-slots in the slot. In some aspects, this may include UE 410 comparing the resource allocation with predefined symbol locations and determining to communicate with base station 405 in accordance with the resource allocation and based at least in part on the comparing. In some aspects, this may include UE 410 receiving multiple control signals from the base station 405, with each control signal indicating different resource allocations for communicating with base station 405. UE 410 may determine that the resource allocations from the multiple control signals overlap and communicate with the base station 405 using the resource allocation from the last of the multiple control signals.

In some aspects, this may include UE 410 identifying that repetitions of either the uplink transmission of the downlink transmission will span more than one slot. Base station 405 may transmit (and UE 410 may receive) a configuration regarding the future slot to be spanned by the uplink transmission or the downlink transmission and identify, based on the configuration information, one or more mini-slots to be used in the future slot for the uplink transmission or the downlink transmission.

In some aspects, this may include UE 410 identifying a repetition of either the uplink transmission or the downlink transmission will span more than one slot. UE 410 may decode a slot format and a control region size of a future slot to be spanned by the uplink transmission or the downlink transmission and identify, based on the decoding, one or more mini-slots to be used in the future slot for the uplink transmission for the downlink transmission.

In some aspects, this may include UE 410 identifying a DMRS configuration to be used in association with the communicating. The DMRS configuration may be associated with the aggregation factor. Accordingly, UE 410 may identify the DMRS configuration by receiving an indication of the DMRS configuration in the control signal and/or by determining DMRS configuration based on the aggregation factor.

In some aspects, this may include UE 410 measuring a channel quality and determining, based on the channel quality a channel quality indicator that is associated with the quality threshold and a requested aggregation factor. In some aspects, transmission to UE 410 using the requested aggregation factor may be expected by the UE 410 to satisfy the quality threshold. In some aspects, this may include UE 410 transmitting (and base station 405 receiving) the channel quality indicator, where the MCS indicated in the control signal is based at least in part on the requested aggregation factor associated with a channel quality indicator. In some aspects, UE 410 may determine the channel quality indicator by selecting the channel quality indicator from a table or from a portion of a table whose entries are each associated with the respective aggregation factors. That is, in some aspects each available channel quality indicator may have a corresponding or otherwise associated aggregation factor.

Figure 5:
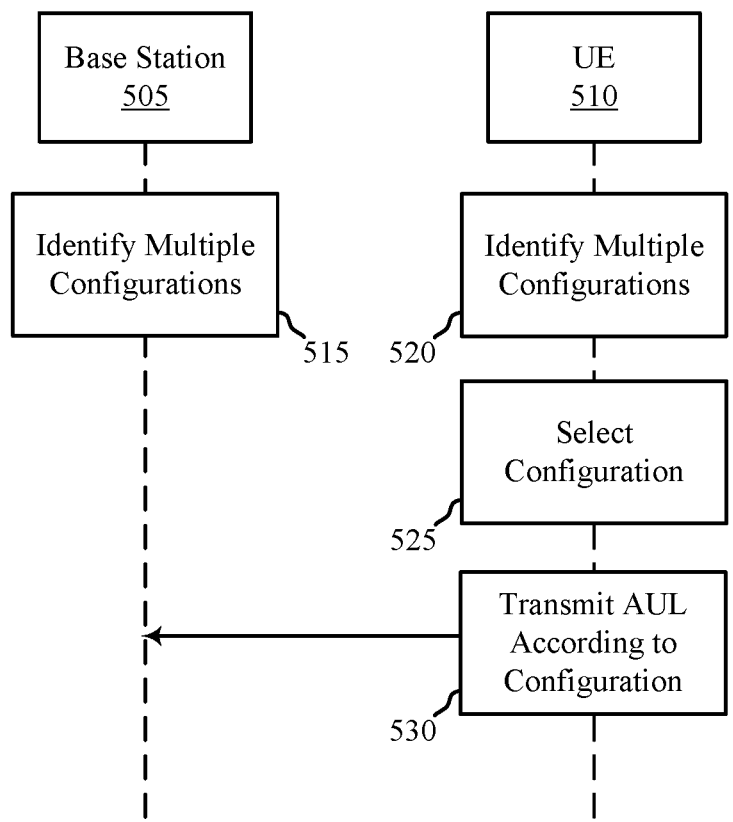
FIG. 5 illustrates an example of a process that supports aggregation factor associations in uplink and downlink transmissions in accordance with aspects of the present disclosure.

FIG. 5 illustrates an example of a process 500 that supports aggregation factor associations in uplink and downlink transmissions in accordance with aspects of the present disclosure. In some examples, process 500 may implement aspects of wireless communication systems 100, 200 and/or slot configuration 300. Aspects of process 500 may be implemented by a base station 505 and/or UE 510, which may be examples of the corresponding devices described herein.

At 515, base station 505 may identify multiple configurations available to UE 510 to use for AUL transmissions, each of the multiple configurations being associated with a corresponding aggregation factor.

At 520, UE 510 may identify multiple configurations available to UE 510 to use for AUL transmissions, each of the multiple configurations being associated with the corresponding aggregation factor.

At 525, UE 510 may select one of the multiple configurations for AUL transmissions. In some aspects, this may include UE 510 selecting the one of the multiple configurations based at least in part on a transport block size, an MCS, a starting symbol for the AUL transmissions, and the like.

At 530, UE 510 may transmit (and base station 505 may receive) the AUL transmissions in accordance with the selected configuration. Accordingly, aspects of process 500 illustrate a mechanism where the aggregation factor may be change dynamically.

Figure 6:
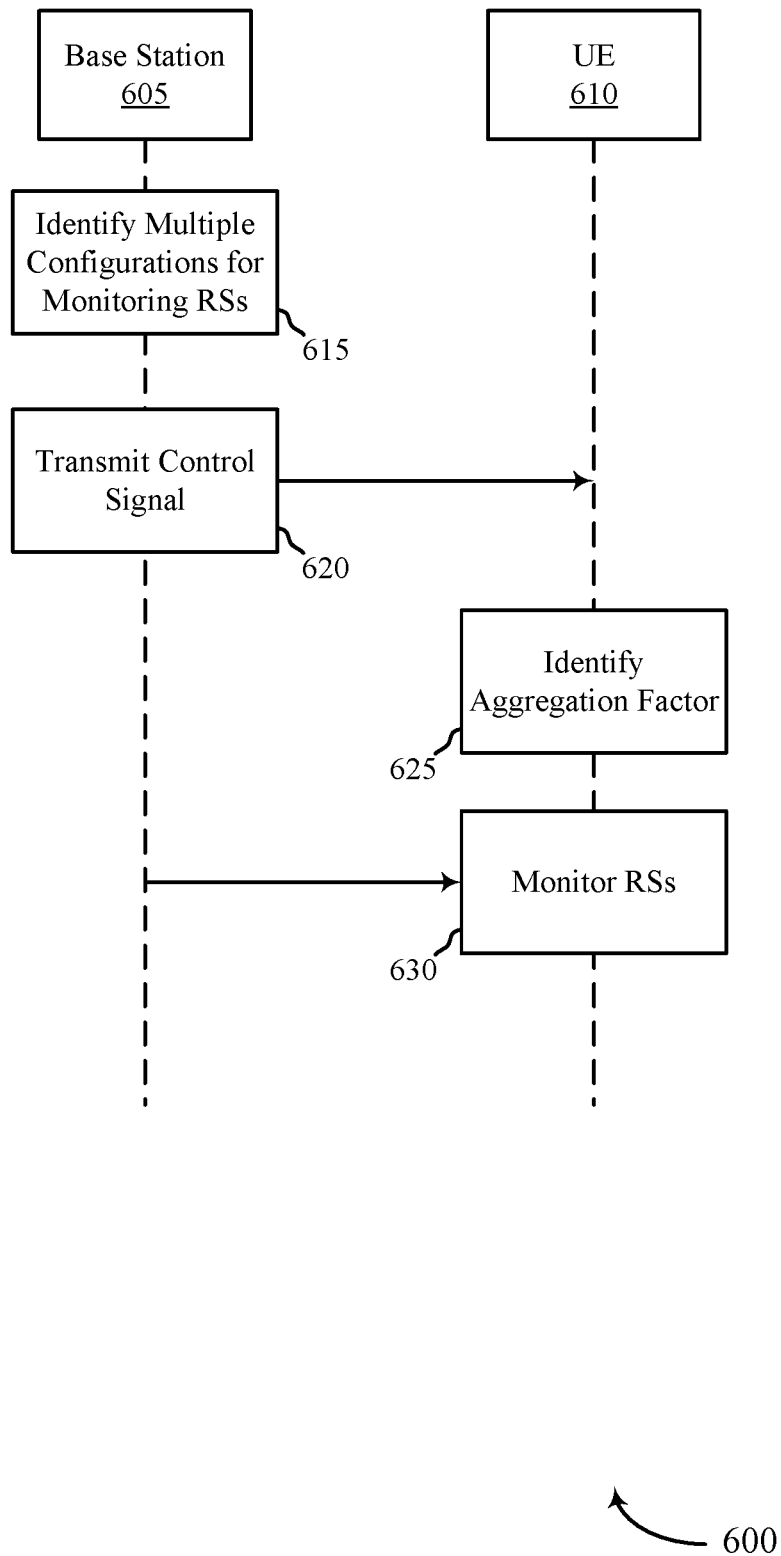
FIG. 6 illustrates an example of a process that supports aggregation factor associations in uplink and downlink transmissions in accordance with aspects of the present disclosure.

FIG. 6 illustrates an example of a process 600 that supports aggregation factor associations in uplink and downlink transmissions in accordance with aspects of the present disclosure. In some examples, process 600 may implement aspects of wireless communication systems 100, 200 and/or slot configuration 300. Aspects of process 600 may be implemented by a base station 605 and/or a UE 610, which may be examples of corresponding devices described herein.

At 615, base station 605 may identify multiple configurations for UE 610 to use for monitoring repetition-based channel state reference signals (e.g., CSI-RSs).

At 620, base station 605 may transmit (and UE 610 may receive) a control signal that is indicative of the designated configuration to be used by UE 610 for monitoring repetition-based channel state reference signals. In some aspects, the designated configuration may be one of the multiple configurations. In some aspects, the control signal and/or the designated configuration may be indicative of an aggregation factor. In some aspects, this may include UE 610 receiving the explicit indication of the designated configuration and the control signal. In some aspects, this may include UE 410 identifying that this is the configuration based on the aggregation factor.

At 625, UE 610 may identify the aggregation factor based on the control signal and/or the designated configuration. In some aspects, this may include UE 610 monitoring only a number of signals associated with the aggregation factor regardless of a number of repetitions included in the designated configuration.

At 630, UE 610 may monitor repetition-based channel state reference signals based at least in part on the designated configuration and/or the aggregation factor. In some aspects, this may include base station 605 transmitting (and UE 610 receiving) a signal indicating that UE 610 is to combined none, some, or all of the repetition base channel state reference signals.

Thus, aspects of process 600 provide a mechanism or multiple CSI-RS configurations are configured for UE 610, with each configuration associated with a given aggregation factor. In some aspects, single or multiple CSI-RS configurations may be configured, each with the fixed length, e.g. based on the MAC's aggregation factor.

Figure 7:
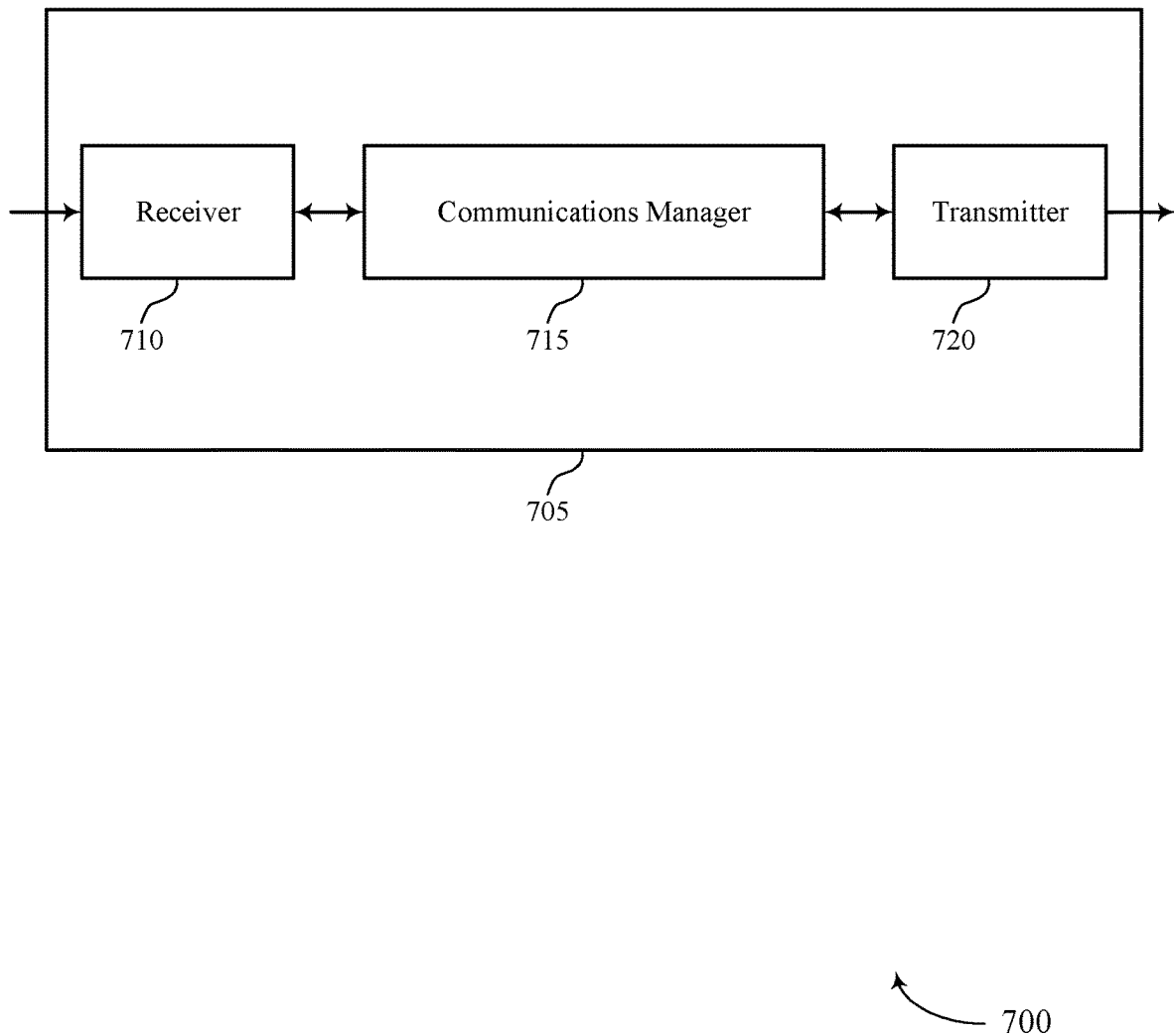
FIGS. 7 and 8 show block diagrams of devices that support aggregation factor associations in uplink and downlink transmissions in accordance with aspects of the present disclosure.

FIG. 7 shows a block diagram 700 of a device 705 that supports aggregation factor associations in uplink and downlink transmissions in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to aggregation factor associations in uplink and downlink transmissions, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, a control signal indicating a resource allocation for either an uplink transmission or a downlink transmission, identify, based on a modulation and coding scheme indicated in the control signal, an aggregation factor of the uplink transmission or the downlink transmission, and communicate with the base station by either transmitting the uplink transmission or receiving the downlink transmission in accordance with the resource allocation and the aggregation factor. The communications manager 715 may also identify multiple configurations available to the UE for autonomous uplink transmissions, each of the multiple configurations being associated with an aggregation factor, select one of the multiple configurations for autonomous uplink transmissions, and transmit the autonomous uplink transmissions in accordance with the selected configuration. The communications manager 715 may also identify multiple configurations for monitoring repetition-based channel state reference signals, receive a control signal that is indicative of a designated configuration to be used by the UE for monitoring repetition-based channel state reference signals, the designated configuration being one of the multiple configurations, identify an aggregation factor based on the control signal or the designated configuration, and monitor repetition-based channel state reference signals based on at least one of the designated configuration or the aggregation factor. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
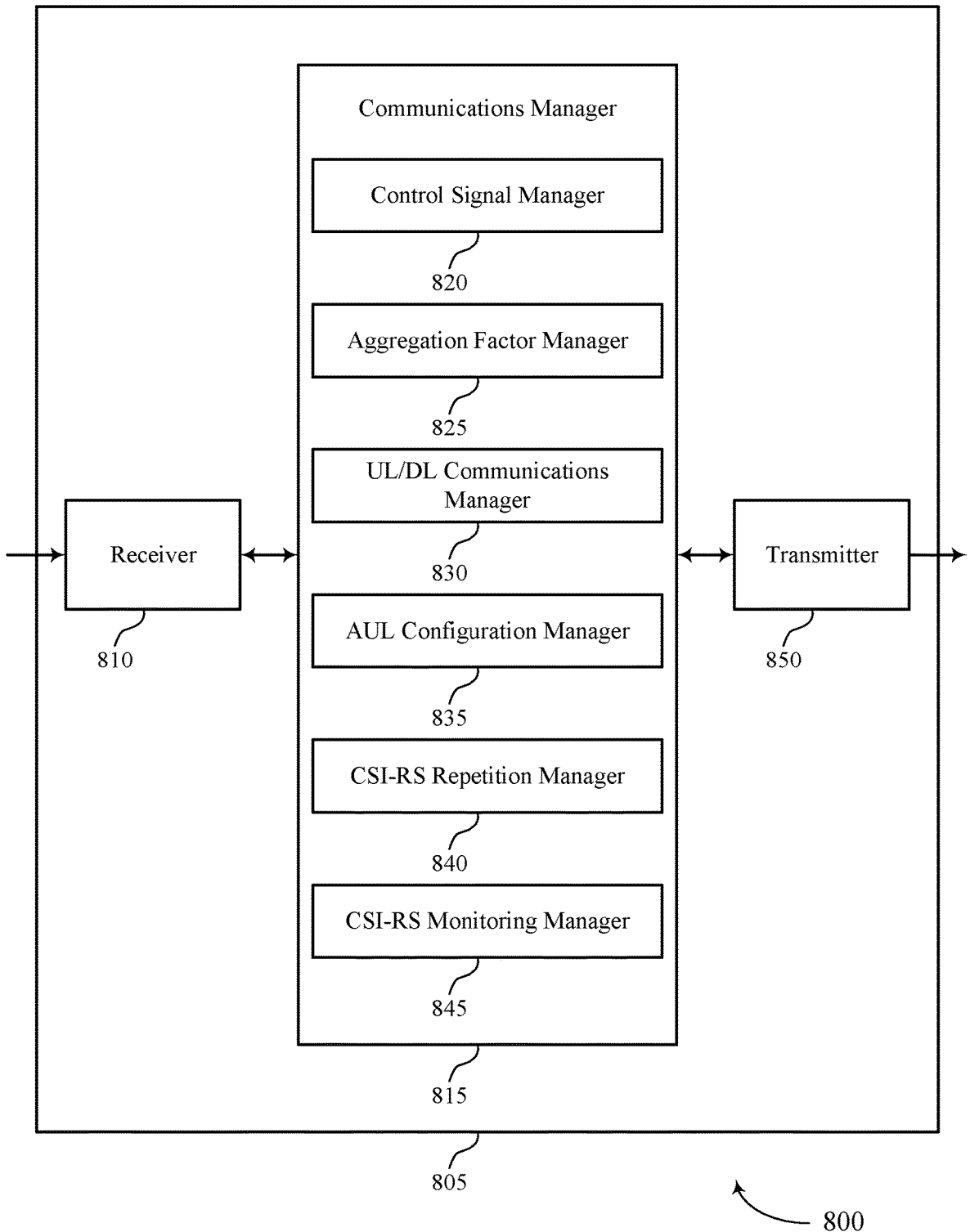

FIG. 8 shows a block diagram 800 of a device 805 that supports aggregation factor associations in uplink and downlink transmissions in accordance with aspects of the present disclosure. The device 805 may be an example of aspects of a device 705, or a UE 115 as described herein. The device 805 may include a receiver 810, a communications manager 815, and a transmitter 850. The device 805 may also include a processor. Each of these components may be in communication with one another (e.g., via one or more buses).

The receiver 810 may receive information such as packets, user data, or control information associated with various information channels (e.g., control channels, data channels, and information related to aggregation factor associations in uplink and downlink transmissions, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a control signal manager 820, an aggregation factor manager 825, an UL/DL communications manager 830, an AUL configuration manager 835, a CSI-RS repetition manager 840, and a CSI-RS monitoring manager 845. The communications manager 815 may be an example of aspects of the communications manager 1010 described herein.

The control signal manager 820 may receive, from a base station, a control signal indicating a resource allocation for either an uplink transmission or a downlink transmission.

The aggregation factor manager 825 may identify, based on a modulation and coding scheme indicated in the control signal, an aggregation factor of the uplink transmission or the downlink transmission.

The UL/DL communications manager 830 may communicate with the base station by either transmitting the uplink transmission or receiving the downlink transmission in accordance with the resource allocation and the aggregation factor.

The AUL configuration manager 835 may identify multiple configurations available to the UE for autonomous uplink transmissions, each of the multiple configurations being associated with an aggregation factor and select one of the multiple configurations for autonomous uplink transmissions.

The UL/DL communications manager 830 may transmit the autonomous uplink transmissions in accordance with the selected configuration.

The CSI-RS repetition manager 840 may identify multiple configurations for monitoring repetition-based channel state reference signals.

The control signal manager 820 may receive a control signal that is indicative of a designated configuration to be used by the UE for monitoring repetition-based channel state reference signals, the designated configuration being one of the multiple configurations.

The aggregation factor manager 825 may identify an aggregation factor based on the control signal or the designated configuration.

The CSI-RS monitoring manager 845 may monitor repetition-based channel state reference signals based on at least one of the designated configuration or the aggregation factor.

The transmitter 850 may transmit signals generated by other components of the device 805. In some examples, the transmitter 850 may be collocated with a receiver 810 in a transceiver module. For example, the transmitter 850 may be an example of aspects of the transceiver 1020 described with reference to FIG. 10. The transmitter 850 may utilize a single antenna or a set of antennas.

Figure 9:
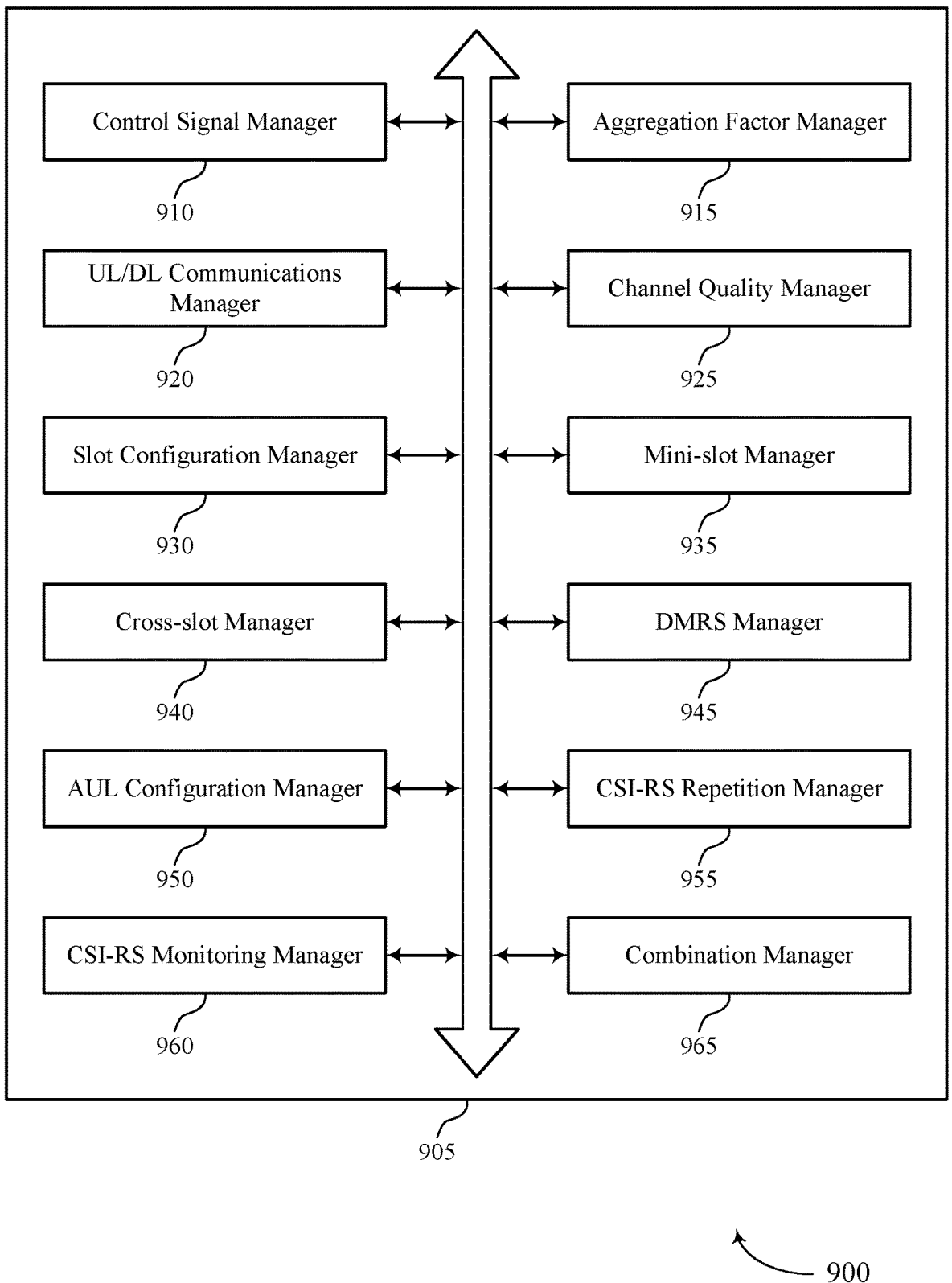
FIG. 9 shows a block diagram of a communications manager that supports aggregation factor associations in uplink and downlink transmissions in accordance with aspects of the present disclosure.

FIG. 9 shows a block diagram 900 of a communications manager 905 that supports aggregation factor associations in uplink and downlink transmissions in accordance with aspects of the present disclosure. The communications manager 905 may be an example of aspects of a communications manager 715, a communications manager 815, or a communications manager 1010 described herein. The communications manager 905 may include a control signal manager 910, an aggregation factor manager 915, an UL/DL communications manager 920, a channel quality manager 925, a slot configuration manager 930, a mini-slot manager 935, a cross-slot manager 940, a DMRS manager 945, an AUL configuration manager 950, a CSI-RS repetition manager 955, a CSI-RS monitoring manager 960, and a combination manager 965. Each of these modules may communicate, directly or indirectly, with one another (e.g., via one or more buses).

The control signal manager 910 may receive, from a base station, a control signal indicating a resource allocation for either an uplink transmission or a downlink transmission.

In some examples, the control signal manager 910 may receive a control signal that is indicative of a designated configuration to be used by the UE for monitoring repetition-based channel state reference signals, the designated configuration being one of the multiple configurations. In some examples, the control signal manager 910 may receive an explicit indication of the designated configuration in the control signal. In some examples, the control signal manager 910 may identify the designated configuration based on the aggregation factor. In some examples, the control signal manager 910 may monitor only a number of signals associated with the aggregation factor regardless of a number of repetitions included in the designated configuration.

The aggregation factor manager 915 may identify, based on a modulation and coding scheme indicated in the control signal, an aggregation factor of the uplink transmission or the downlink transmission. In some examples, the aggregation factor manager 915 may identify an aggregation factor based on the control signal or the designated configuration. In some examples, the aggregation factor manager 915 may identify that the modulation and coding scheme indicated in the control signal is associated with the aggregation factor. In some cases, the aggregation factor is dynamically indicated via the control signal.

The UL/DL communications manager 920 may communicate with the base station by either transmitting the uplink transmission or receiving the downlink transmission in accordance with the resource allocation and the aggregation factor. In some examples, the UL/DL communications manager 920 may transmit the autonomous uplink transmissions in accordance with the selected configuration.

In some examples, the UL/DL communications manager 920 may transmit the uplink transmission or receiving the downlink transmission such that a first symbol of the uplink transmission or downlink transmission is transmitted or received only at predefined symbol locations within a slot or mini-slot, where the predefined symbol locations are associated with a length of one or more mini-slots in the slot.

In some examples, the UL/DL communications manager 920 may compare the resource allocation with the predefined symbol locations. In some examples, the UL/DL communications manager 920 may determine to communicate with the base station and in accordance with the resource allocation based on the comparing. In some examples, the UL/DL communications manager 920 may receive multiple control signals from the base station, each control signal indicating different resource allocations for communications with the base station.

In some examples, the UL/DL communications manager 920 may determine that the resource allocations from the multiple control signals overlap. In some examples, the UL/DL communications manager 920 may communicate with the base station using the resource allocation from a last of the multiple control signals.

The AUL configuration manager 950 may identify multiple configurations available to the UE for autonomous uplink transmissions, each of the multiple configurations being associated with an aggregation factor. In some examples, the AUL configuration manager 950 may select one of the multiple configurations for autonomous uplink transmissions. In some examples, the AUL configuration manager 950 may select the one of the multiple configurations based on a transport block size, a modulation and coding scheme, a starting symbol for the autonomous uplink transmissions, or combinations thereof.

The CSI-RS repetition manager 955 may identify multiple configurations for monitoring repetition-based channel state reference signals.

The CSI-RS monitoring manager 960 may monitor repetition-based channel state reference signals based on at least one of the designated configuration or the aggregation factor.

The channel quality manager 925 may measure channel quality. In some examples, the channel quality manager 925 may determine, based at least on the measured channel quality, a channel quality indicator that is associated with a quality threshold and a requested aggregation factor, where transmissions to the UE using the requested aggregation factor are expected by the UE to satisfy the quality threshold.

In some examples, the channel quality manager 925 may transmit the channel quality indicator to the base station, where the modulation and coding scheme indicated in the control signal is based on the requested aggregation factor associated with the channel quality indicator.

In some examples, the channel quality manager 925 may select the channel quality indicator from a table or from a portion of a table whose entries are each associated with respective aggregation factors.

The slot configuration manager 930 may monitor for the control signal at predefined symbol locations within a slot or mini-slot, where the predefined symbol locations are associated with a length of one or more mini-slots in the slot.

The mini-slot manager 935 may identify that repetitions of either the uplink transmission or the downlink transmission will span more than one slot.

In some examples, the mini-slot manager 935 may receive configuration information regarding a future slot to be spanned by the uplink transmission or the downlink transmission.

In some examples, the mini-slot manager 935 may identify, based on the configuration information, one or more mini-slots to be used in the future slot for the uplink transmission or the downlink transmission.

The cross-slot manager 940 may identify that repetitions of either the uplink transmission or the downlink transmission will span more than one slot.

In some examples, the cross-slot manager 940 may decode a slot format and control region size of a future slot to be spanned by the uplink transmission or the downlink transmission. In some examples, the cross-slot manager 940 may identify, based on the decoding, one or more mini-slots to be used in the future slot for the uplink transmission or the downlink transmission.

The DMRS manager 945 may identify a demodulation reference signal configuration to be used in association with the communicating, where the demodulation reference signal configuration is associated with the aggregation factor.

In some examples, the DMRS manager 945 may receive an indication of the demodulation reference signal configuration in the control signal. In some examples, the DMRS manager 945 may determine the demodulation reference signal configuration based on the aggregation factor.

The combination manager 965 may receive a signal indicating that the UE is to combine none, some, or all of the repetition-based channel state reference signals.

Figure 10:
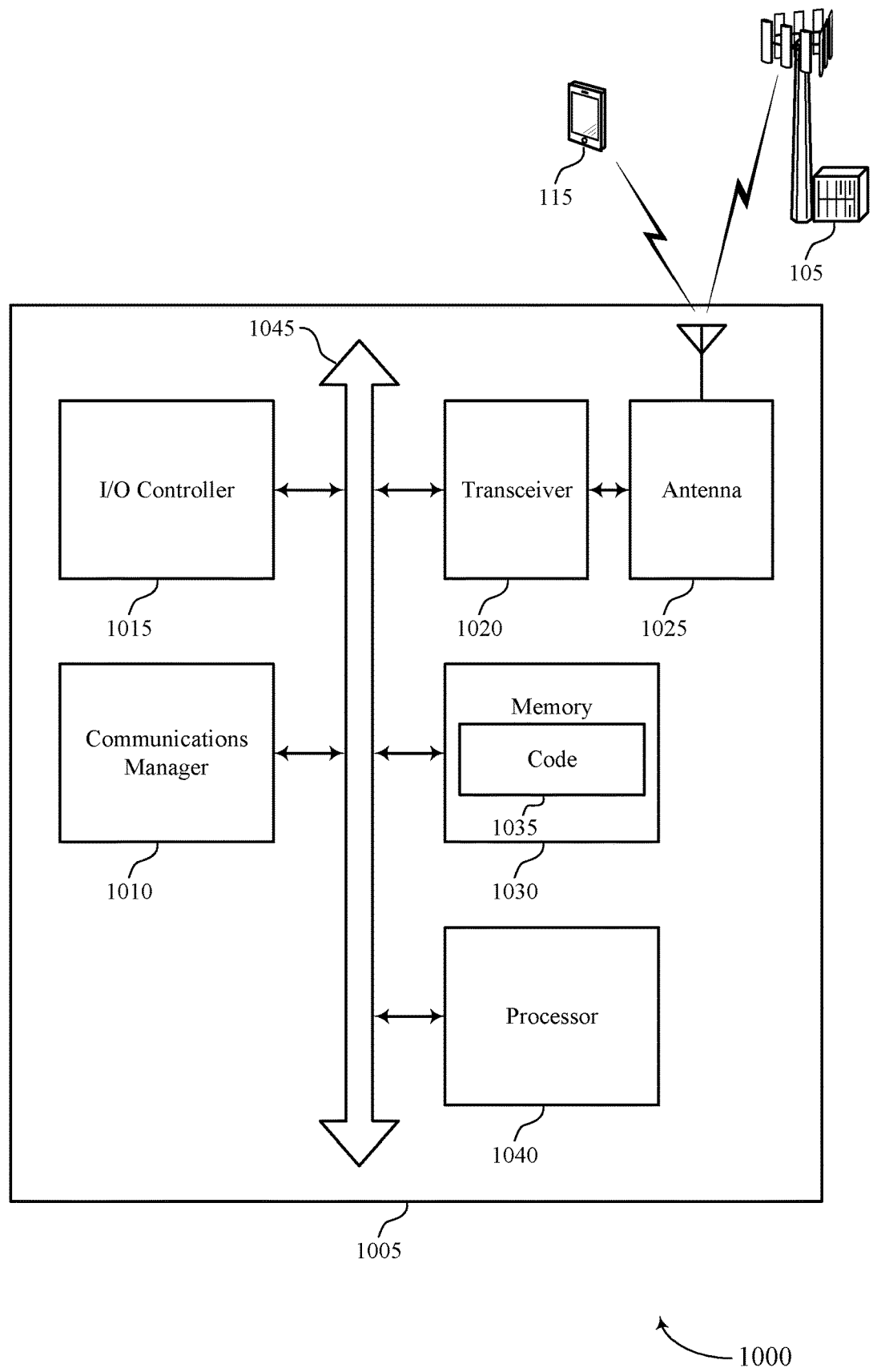
FIG. 10 shows a diagram of a system including a device that supports aggregation factor associations in uplink and downlink transmissions in accordance with aspects of the present disclosure.

FIG. 10 shows a diagram of a system 1000 including a device 1005 that supports aggregation factor associations in uplink and downlink transmissions in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, a control signal indicating a resource allocation for either an uplink transmission or a downlink transmission, identify, based on a modulation and coding scheme indicated in the control signal, an aggregation factor of the uplink transmission or the downlink transmission, and communicate with the base station by either transmitting the uplink transmission or receiving the downlink transmission in accordance with the resource allocation and the aggregation factor. The communications manager 1010 may also identify multiple configurations available to the UE for autonomous uplink transmissions, each of the multiple configurations being associated with an aggregation factor, select one of the multiple configurations for autonomous uplink transmissions, and transmit the autonomous uplink transmissions in accordance with the selected configuration. The communications manager 1010 may also identify multiple configurations for monitoring repetition-based channel state reference signals, receive a control signal that is indicative of a designated configuration to be used by the UE for monitoring repetition-based channel state reference signals, the designated configuration being one of the multiple configurations, identify an aggregation factor based on the control signal or the designated configuration, and monitor repetition-based channel state reference signals based on at least one of the designated configuration or the aggregation factor.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting aggregation factor associations in uplink and downlink transmissions).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
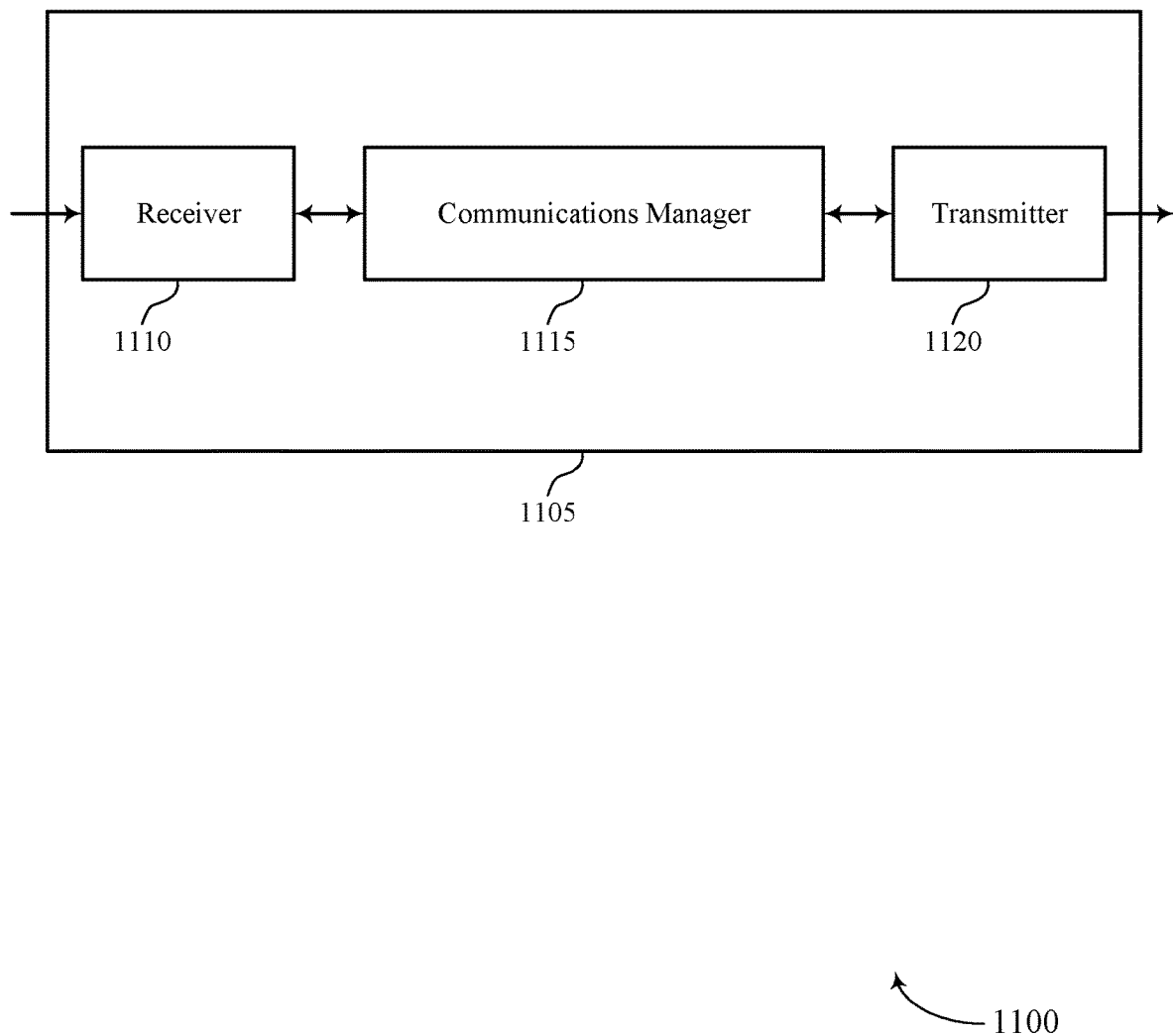
FIGS. 11 and 12 show block diagrams of devices that support aggregation factor associations in uplink and downlink transmissions in accordance with aspects of the present disclosure.

FIG. 11 shows a block diagram 1100 of a device 1105 that supports aggregation factor associations in uplink and downlink transmissions in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to aggregation factor associations in uplink and downlink transmissions, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify an aggregation factor associated with either an uplink transmission to be received from a UE or a downlink transmission to be transmitted to the UE, transmit, to the UE, a control signal indicating a resource allocation for either the uplink transmission or the downlink transmission, where the control signal indicates a modulation and coding scheme associated with the aggregation factor, and communicate with the UE by either receiving the uplink transmission or transmitting the downlink transmission in accordance with the resource allocation and the aggregation factor. The communications manager 1115 may also identify multiple configurations available to a UE for autonomous uplink transmissions, each of the multiple configurations being associated with an aggregation factor, receive the autonomous uplink transmissions in accordance with a configuration of the multiple configurations selected by the UE, identify multiple configurations for monitoring repetition-based channel state reference signals, and transmit a control signal to a UE that is indicative of a designated configuration to be used by the UE for monitoring repetition-based channel state reference signals, the designated configuration being one of the multiple configurations, where at least one of the control signal or the designated configuration being indicative of an aggregation factor. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
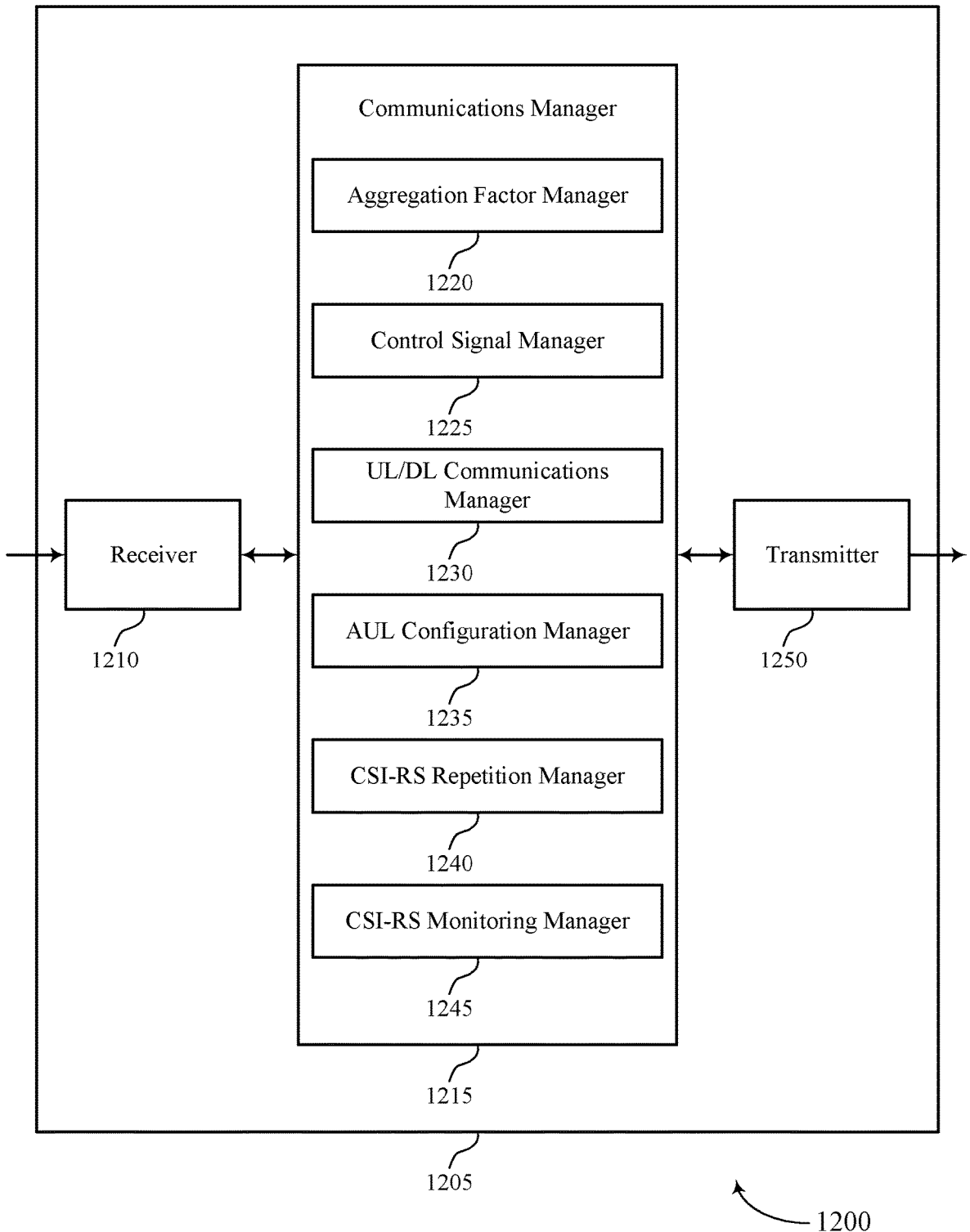

FIG. 12 shows a block diagram 1200 of a device 1205 that supports aggregation factor associations in uplink and downlink transmissions in accordance with aspects of the present disclosure. The device 1205 may be an example of aspects of a device 1105, or a base station 105 as described herein. The device 1205 may include a receiver 1210, a communications manager 1215, and a transmitter 1250. The device 1205 may also include a processor. Each of these components may be in communication with one another (e.g., via one or more buses).

The receiver 1210 may receive information such as packets, user data, or control information associated with various information channels (e.g., control channels, data channels, and information related to aggregation factor associations in uplink and downlink transmissions, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an aggregation factor manager 1220, a control signal manager 1225, an UL/DL communications manager 1230, an AUL configuration manager 1235, a CSI-RS repetition manager 1240, and a CSI-RS monitoring manager 1245. The communications manager 1215 may be an example of aspects of the communications manager 1410 described herein.

The aggregation factor manager 1220 may identify an aggregation factor associated with either an uplink transmission to be received from a UE or a downlink transmission to be transmitted to the UE.

The control signal manager 1225 may transmit, to the UE, a control signal indicating a resource allocation for either the uplink transmission or the downlink transmission, where the control signal indicates a modulation and coding scheme associated with the aggregation factor.

The UL/DL communications manager 1230 may communicate with the UE by either receiving the uplink transmission or transmitting the downlink transmission in accordance with the resource allocation and the aggregation factor.

The AUL configuration manager 1235 may identify multiple configurations available to a UE for autonomous uplink transmissions, each of the multiple configurations being associated with an aggregation factor and receive the autonomous uplink transmissions in accordance with a configuration of the multiple configurations selected by the UE.

The CSI-RS repetition manager 1240 may identify multiple configurations for monitoring repetition-based channel state reference signals.

The CSI-RS monitoring manager 1245 may transmit a control signal to a UE that is indicative of a designated configuration to be used by the UE for monitoring repetition-based channel state reference signals, the designated configuration being one of the multiple configurations, where at least one of the control signal or the designated configuration being indicative of an aggregation factor.

The transmitter 1250 may transmit signals generated by other components of the device 1205. In some examples, the transmitter 1250 may be collocated with a receiver 1210 in a transceiver module. For example, the transmitter 1250 may be an example of aspects of the transceiver 1420 described with reference to FIG. 14. The transmitter 1250 may utilize a single antenna or a set of antennas.

Figure 13:
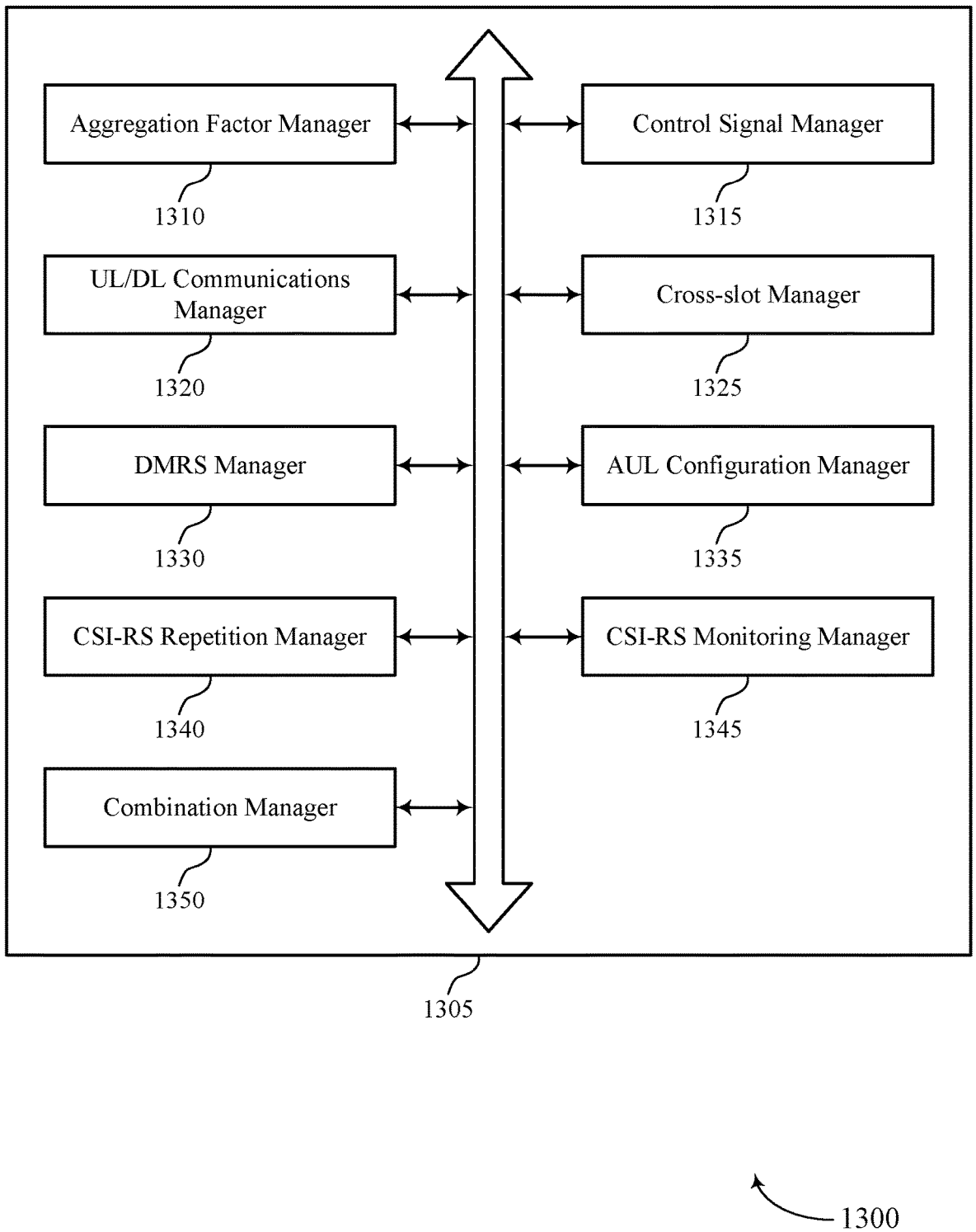
FIG. 13 shows a block diagram of a communications manager that supports aggregation factor associations in uplink and downlink transmissions in accordance with aspects of the present disclosure.

FIG. 13 shows a block diagram 1300 of a communications manager 1305 that supports aggregation factor associations in uplink and downlink transmissions in accordance with aspects of the present disclosure. The communications manager 1305 may be an example of aspects of a communications manager 1115, a communications manager 1215, or a communications manager 1410 described herein. The communications manager 1305 may include an aggregation factor manager 1310, a control signal manager 1315, an UL/DL communications manager 1320, a cross-slot manager 1325, a DMRS manager 1330, an AUL configuration manager 1335, a CSI-RS repetition manager 1340, a CSI-RS monitoring manager 1345, and a combination manager 1350. Each of these modules may communicate, directly or indirectly, with one another (e.g., via one or more buses).

The aggregation factor manager 1310 may identify an aggregation factor associated with either an uplink transmission to be received from a UE or a downlink transmission to be transmitted to the UE.

In some examples, the aggregation factor manager 1310 may receive a channel quality indicator from the UE, where the channel quality indicator is associated with a requested aggregation factor such that transmissions to the UE using the requested aggregation factor are expected by the UE to satisfy a quality threshold associated with the channel quality indicator.

In some examples, the aggregation factor manager 1310 may set the aggregation factor to be equal to the requested aggregation factor. In some cases, the aggregation factor is dynamically indicated to the UE via the control signal. In some cases, the channel quality indicator is from a table or from a portion of a table whose entries are each associated with respective aggregation factors.

The control signal manager 1315 may transmit, to the UE, a control signal indicating a resource allocation for either the uplink transmission or the downlink transmission, where the control signal indicates a modulation and coding scheme associated with the aggregation factor.

The UL/DL communications manager 1320 may communicate with the UE by either receiving the uplink transmission or transmitting the downlink transmission in accordance with the resource allocation and the aggregation factor.

In some examples, the UL/DL communications manager 1320 may receive the uplink transmission or transmitting the downlink transmission such that a first symbol of the uplink transmission or downlink transmission is received or transmitted only at predefined symbol locations within a slot or mini-slot, where the predefined symbol locations are associated with a length of one or more mini-slots in the slot.

The AUL configuration manager 1335 may identify multiple configurations available to a UE for autonomous uplink transmissions, each of the multiple configurations being associated with an aggregation factor.

In some examples, the AUL configuration manager 1335 may receive the autonomous uplink transmissions in accordance with a configuration of the multiple configurations selected by the UE.

The CSI-RS repetition manager 1340 may identify multiple configurations for monitoring repetition-based channel state reference signals.

The CSI-RS monitoring manager 1345 may transmit a control signal to a UE that is indicative of a designated configuration to be used by the UE for monitoring repetition-based channel state reference signals, the designated configuration being one of the multiple configurations, where at least one of the control signal or the designated configuration being indicative of an aggregation factor.

In some examples, the CSI-RS monitoring manager 1345 may transmit an explicit indication of the designated configuration in the control signal.

The cross-slot manager 1325 may identify that repetitions of either the uplink transmission or the downlink transmission will span more than one slot. In some examples, the cross-slot manager 1325 may transmit configuration information regarding a future slot to be spanned by the uplink transmission or the downlink transmission. In some examples, the cross-slot manager 1325 may identify, based on the configuration information, one or more mini-slots to be used in the future slot for the uplink transmission or the downlink transmission.

The DMRS manager 1330 may identify a demodulation reference signal configuration to be used in association with the communicating, where the demodulation reference signal configuration is associated with the aggregation factor.

In some examples, the DMRS manager 1330 may transmit to the UE an indication of the demodulation reference signal configuration in the control signal.

The combination manager 1350 may transmit a signal indicating that the UE is to combine none, some, or all of the repetition-based channel state reference signals.

Figure 14:
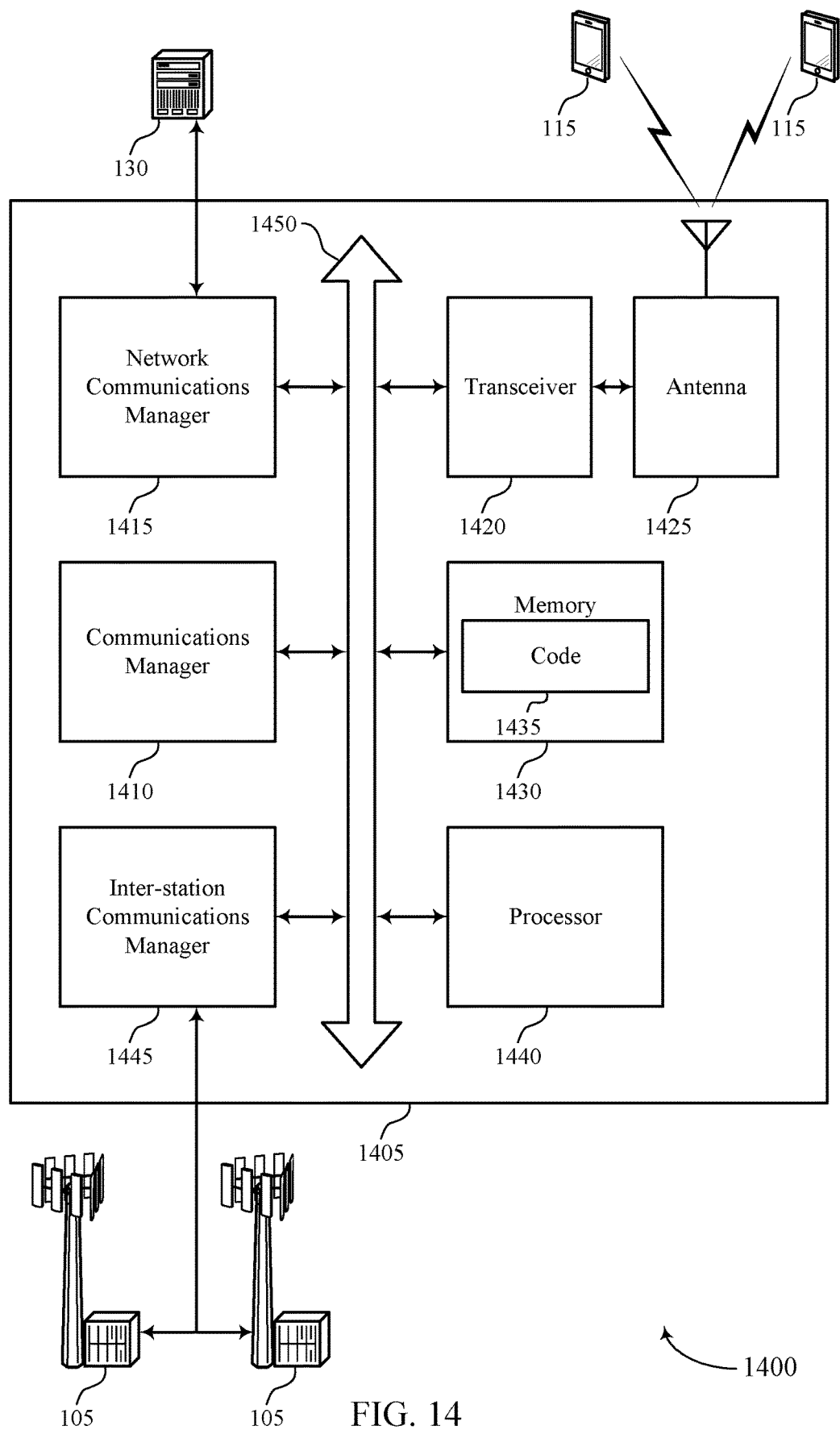
FIG. 14 shows a diagram of a system including a device that supports aggregation factor associations in uplink and downlink transmissions in accordance with aspects of the present disclosure.

FIG. 14 shows a diagram of a system 1400 including a device 1405 that supports aggregation factor associations in uplink and downlink transmissions in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may identify an aggregation factor associated with either an uplink transmission to be received from a UE or a downlink transmission to be transmitted to the UE, transmit, to the UE, a control signal indicating a resource allocation for either the uplink transmission or the downlink transmission, where the control signal indicates a modulation and coding scheme associated with the aggregation factor, and communicate with the UE by either receiving the uplink transmission or transmitting the downlink transmission in accordance with the resource allocation and the aggregation factor. The communications manager 1410 may also identify multiple configurations available to a UE for autonomous uplink transmissions, each of the multiple configurations being associated with an aggregation factor, receive the autonomous uplink transmissions in accordance with a configuration of the multiple configurations selected by the UE, identify multiple configurations for monitoring repetition-based channel state reference signals, and transmit a control signal to a UE that is indicative of a designated configuration to be used by the UE for monitoring repetition-based channel state reference signals, the designated configuration being one of the multiple configurations, where at least one of the control signal or the designated configuration being indicative of an aggregation factor.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting aggregation factor associations in uplink and downlink transmissions).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
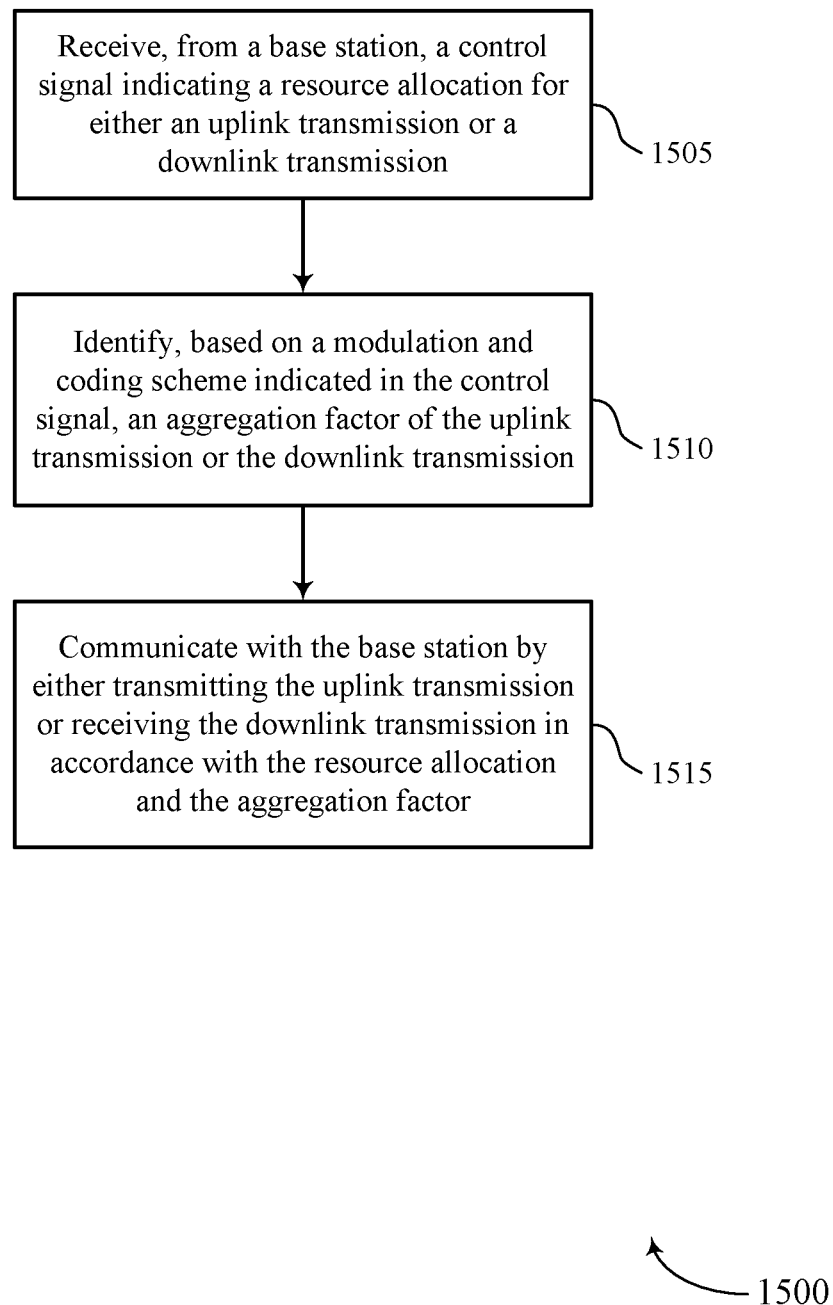
FIGS. 15 through 20 show flowcharts illustrating methods that support aggregation factor associations in uplink and downlink transmissions in accordance with aspects of the present disclosure.

FIG. 15 shows a flowchart illustrating a method 1500 that supports aggregation factor associations in uplink and downlink transmissions in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a control signal indicating a resource allocation for either an uplink transmission or a downlink transmission. The operations of 1505 may be performed according to the methods described herein. In some examples, aspects of the operations of 1505 may be performed by a control signal manager as described with reference to FIGS. 7 through 10.

At 1510, the UE may identify, based on a modulation and coding scheme indicated in the control signal, an aggregation factor of the uplink transmission or the downlink transmission. The operations of 1510 may be performed according to the methods described herein. In some examples, aspects of the operations of 1510 may be performed by an aggregation factor manager as described with reference to FIGS. 7 through 10.

At 1515, the UE may communicate with the base station by either transmitting the uplink transmission or receiving the downlink transmission in accordance with the resource allocation and the aggregation factor. The operations of 1515 may be performed according to the methods described herein. In some examples, aspects of the operations of 1515 may be performed by an UL/DL communications manager as described with reference to FIGS. 7 through 10.

Figure 16:
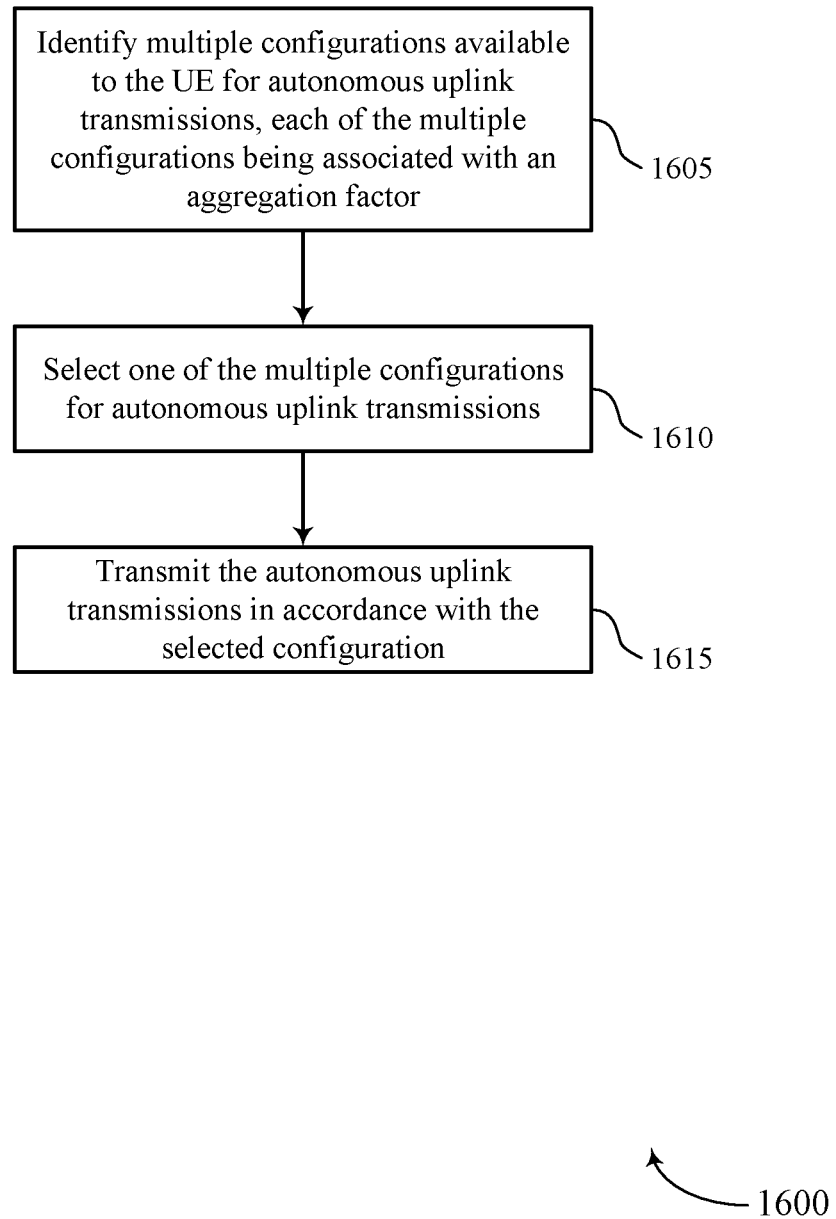

FIG. 16 shows a flowchart illustrating a method 1600 that supports aggregation factor associations in uplink and downlink transmissions in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may identify multiple configurations available to the UE for autonomous uplink transmissions, each of the multiple configurations being associated with an aggregation factor. The operations of 1605 may be performed according to the methods described herein. In some examples, aspects of the operations of 1605 may be performed by an AUL configuration manager as described with reference to FIGS. 7 through 10.

At 1610, the UE may select one of the multiple configurations for autonomous uplink transmissions. The operations of 1610 may be performed according to the methods described herein. In some examples, aspects of the operations of 1610 may be performed by an AUL configuration manager as described with reference to FIGS. 7 through 10.

At 1615, the UE may transmit the autonomous uplink transmissions in accordance with the selected configuration. The operations of 1615 may be performed according to the methods described herein. In some examples, aspects of the operations of 1615 may be performed by an UL/DL communications manager as described with reference to FIGS. 7 through 10.

Figure 17:
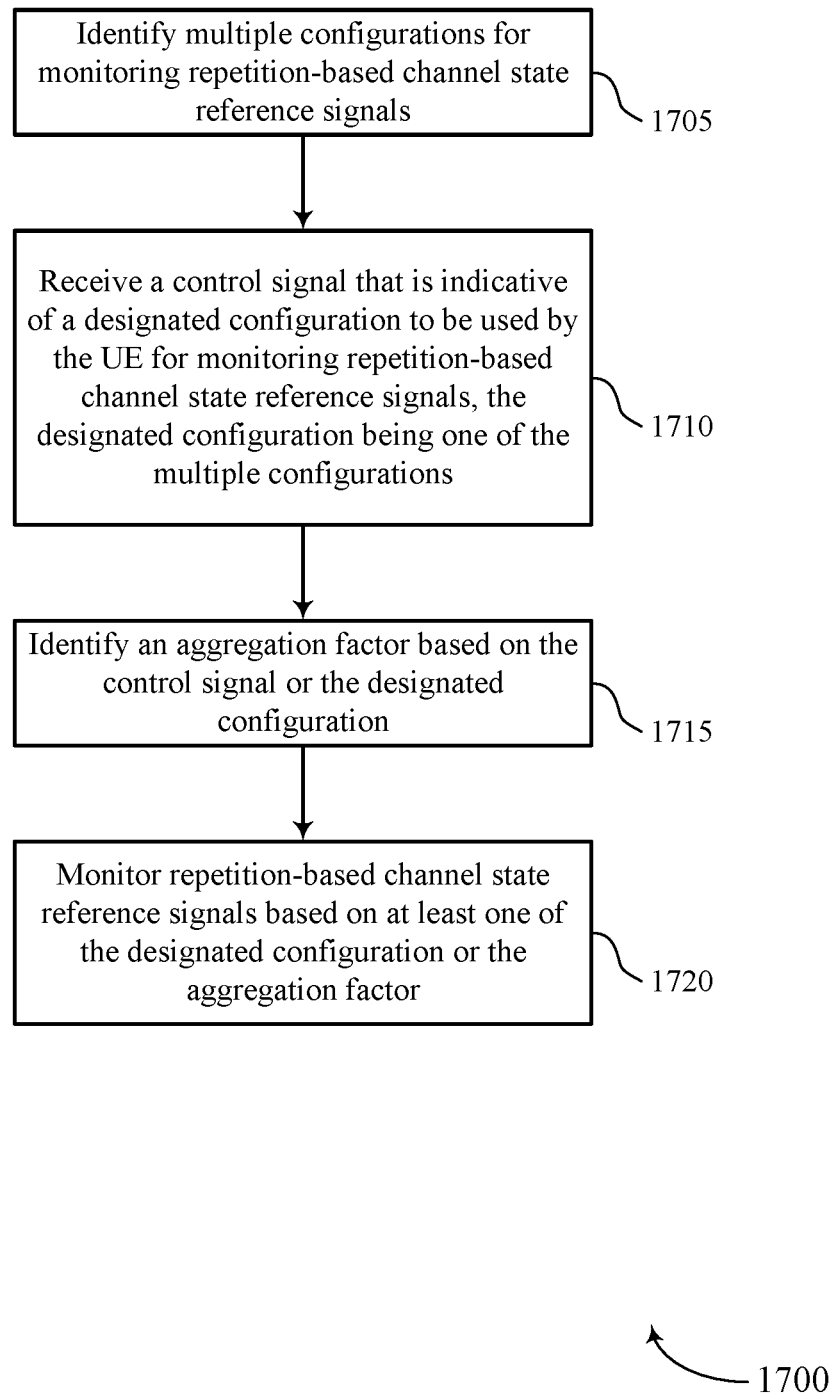

FIG. 17 shows a flowchart illustrating a method 1700 that supports aggregation factor associations in uplink and downlink transmissions in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may identify multiple configurations for monitoring repetition-based channel state reference signals. The operations of 1705 may be performed according to the methods described herein. In some examples, aspects of the operations of 1705 may be performed by a CSI-RS repetition manager as described with reference to FIGS. 7 through 10.

At 1710, the UE may receive a control signal that is indicative of a designated configuration to be used by the UE for monitoring repetition-based channel state reference signals, the designated configuration being one of the multiple configurations. The operations of 1710 may be performed according to the methods described herein. In some examples, aspects of the operations of 1710 may be performed by a control signal manager as described with reference to FIGS. 7 through 10.

At 1715, the UE may identify an aggregation factor based on the control signal or the designated configuration. The operations of 1715 may be performed according to the methods described herein. In some examples, aspects of the operations of 1715 may be performed by an aggregation factor manager as described with reference to FIGS. 7 through 10.

At 1720, the UE may monitor repetition-based channel state reference signals based on at least one of the designated configuration or the aggregation factor. The operations of 1720 may be performed according to the methods described herein. In some examples, aspects of the operations of 1720 may be performed by a CSI-RS monitoring manager as described with reference to FIGS. 7 through 10.

Figure 18:
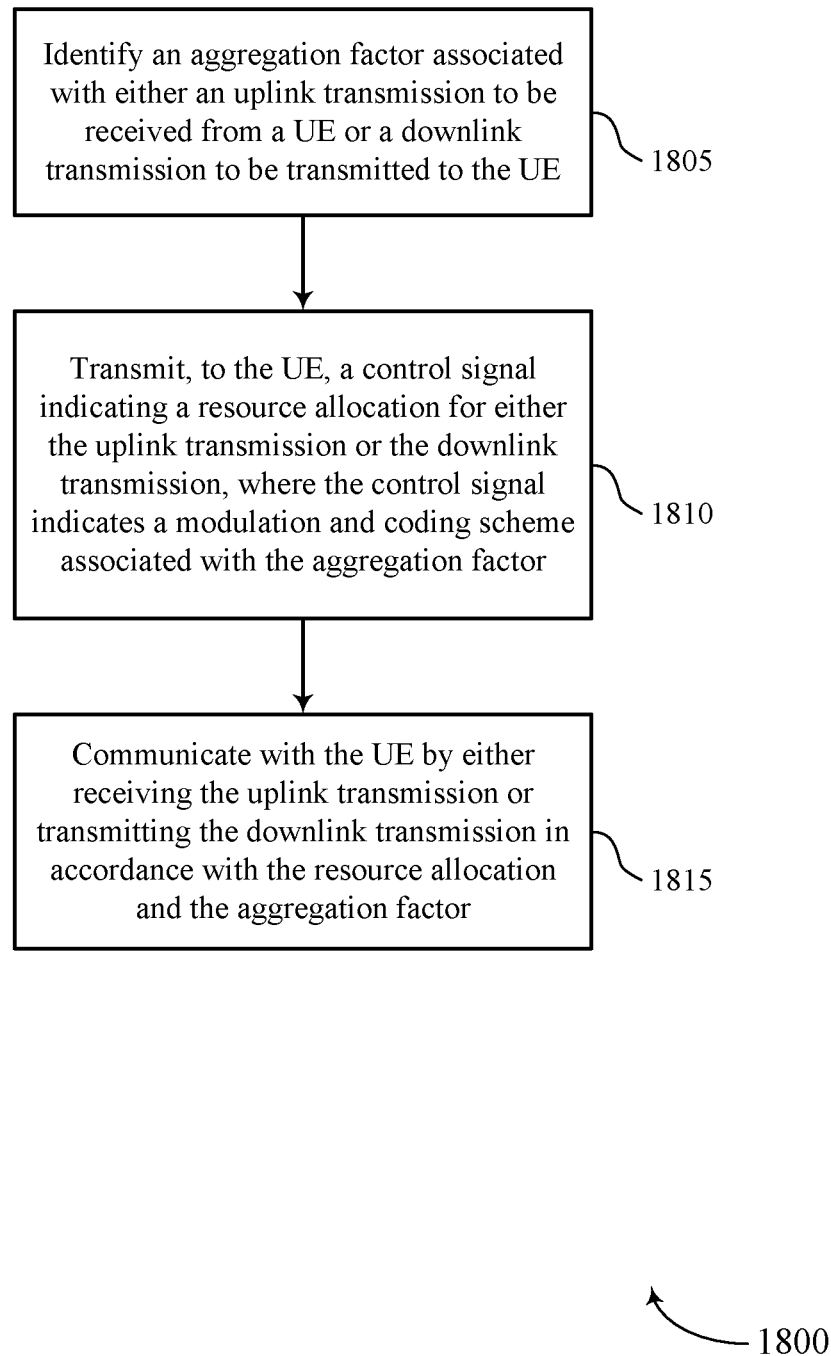

FIG. 18 shows a flowchart illustrating a method 1800 that supports aggregation factor associations in uplink and downlink transmissions in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may identify an aggregation factor associated with either an uplink transmission to be received from a UE or a downlink transmission to be transmitted to the UE. The operations of 1805 may be performed according to the methods described herein. In some examples, aspects of the operations of 1805 may be performed by an aggregation factor manager as described with reference to FIGS. 11 through 14.

At 1810, the base station may transmit, to the UE, a control signal indicating a resource allocation for either the uplink transmission or the downlink transmission, where the control signal indicates a modulation and coding scheme associated with the aggregation factor. The operations of 1810 may be performed according to the methods described herein. In some examples, aspects of the operations of 1810 may be performed by a control signal manager as described with reference to FIGS. 11 through 14.

At 1815, the base station may communicate with the UE by either receiving the uplink transmission or transmitting the downlink transmission in accordance with the resource allocation and the aggregation factor. The operations of 1815 may be performed according to the methods described herein. In some examples, aspects of the operations of 1815 may be performed by an UL/DL communications manager as described with reference to FIGS. 11 through 14.

Figure 19:
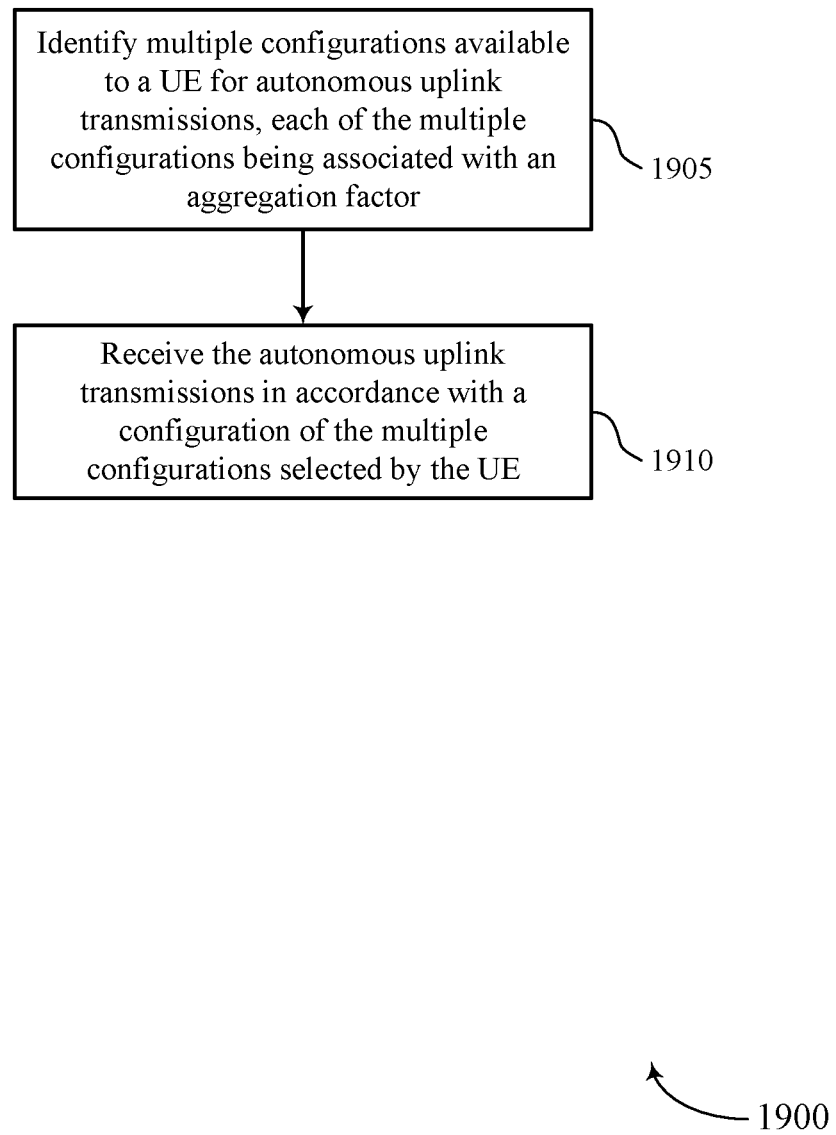

FIG. 19 shows a flowchart illustrating a method 1900 that supports aggregation factor associations in uplink and downlink transmissions in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may identify multiple configurations available to a UE for autonomous uplink transmissions, each of the multiple configurations being associated with an aggregation factor. The operations of 1905 may be performed according to the methods described herein. In some examples, aspects of the operations of 1905 may be performed by an AUL configuration manager as described with reference to FIGS. 11 through 14.

At 1910, the base station may receive the autonomous uplink transmissions in accordance with a configuration of the multiple configurations selected by the UE. The operations of 1910 may be performed according to the methods described herein. In some examples, aspects of the operations of 1910 may be performed by an AUL configuration manager as described with reference to FIGS. 11 through 14.

Figure 20:
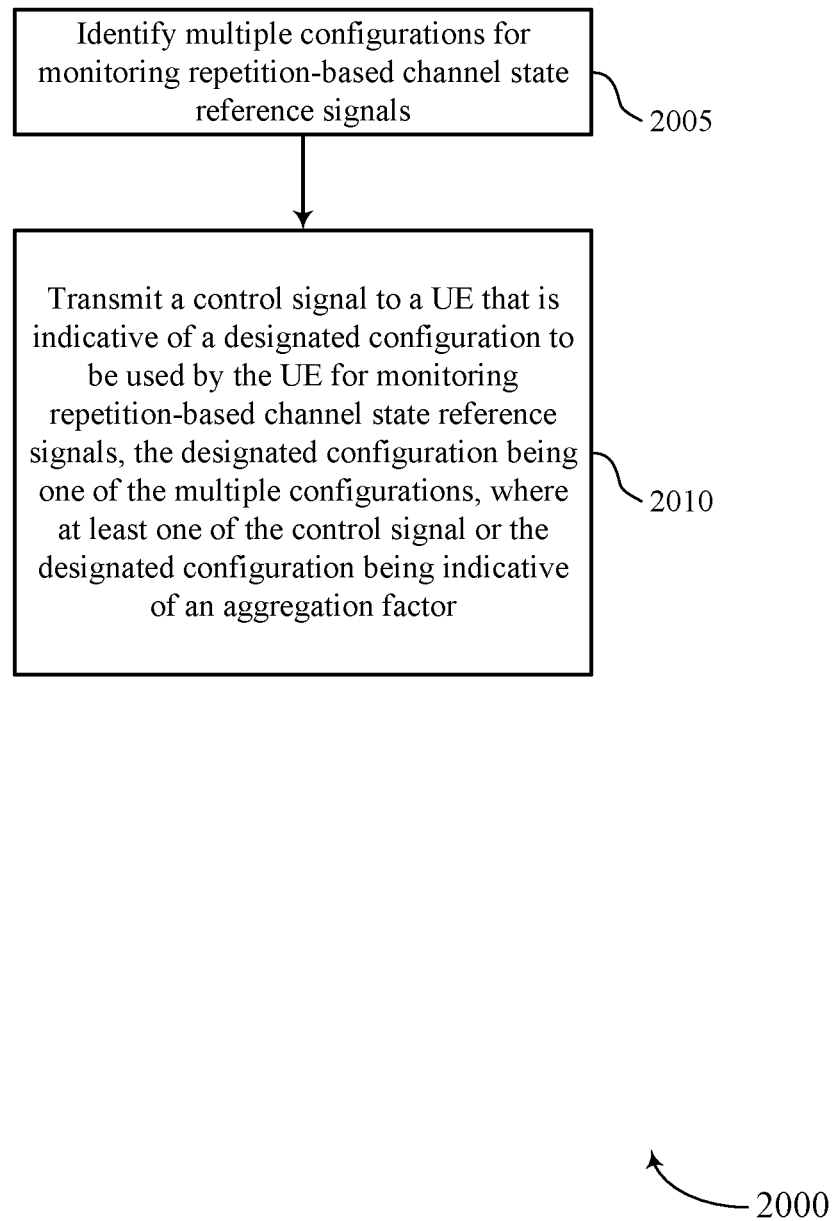

FIG. 20 shows a flowchart illustrating a method 2000 that supports aggregation factor associations in uplink and downlink transmissions in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may identify multiple configurations for monitoring repetition-based channel state reference signals. The operations of 2005 may be performed according to the methods described herein. In some examples, aspects of the operations of 2005 may be performed by a CSI-RS repetition manager as described with reference to FIGS. 11 through 14.

At 2010, the base station may transmit a control signal to a UE that is indicative of a designated configuration to be used by the UE for monitoring repetition-based channel state reference signals, the designated configuration being one of the multiple configurations, where at least one of the control signal or the designated configuration being indicative of an aggregation factor. The operations of 2010 may be performed according to the methods described herein. In some examples, aspects of the operations of 2010 may be performed by a CSI-RS monitoring manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, via radio resource control signaling, multiple autonomous uplink transmission configurations available to the UE for autonomous uplink transmissions, each of the multiple autonomous uplink transmission configurations being associated with an aggregation factor;
   selecting an autonomous uplink transmission configuration of the multiple autonomous uplink transmission configurations for the autonomous uplink transmissions; and
   transmitting the autonomous uplink transmissions in accordance with the selected autonomous uplink transmission configuration, wherein each of the autonomous uplink transmissions are transmitted to avoid use of an orphan symbol, wherein the orphan symbol is a single and only symbol of a multi-symbol transport block assigned to a slot.

2. The method of claim 1, wherein selecting the autonomous uplink transmission configuration comprises:
   selecting the autonomous uplink transmission configuration of the multiple autonomous uplink transmission configurations based at least in part on a transport block size, a modulation and coding scheme, a starting symbol for the autonomous uplink transmissions, or combinations thereof.

3. A method for wireless communications at a base station, comprising:
   transmitting, via radio resource control signaling, multiple autonomous uplink transmission configurations available to a user equipment (UE) for autonomous uplink transmissions, each of the multiple autonomous uplink transmission configurations being associated with an aggregation factor; and
   receiving the autonomous uplink transmissions in accordance with an autonomous uplink transmission configuration of the multiple autonomous uplink transmission configurations selected by the UE, wherein each of the autonomous uplink transmissions avoids use of an orphan symbol, wherein the orphan symbol is a single and only symbol of a multi-symbol transport block assigned to a slot.

4. An apparatus for wireless communications at a user equipment (UE), comprising: a processor, memory coupled with the processor; and instructions stored in the memory and executable by the processor to cause the apparatus to:
receive, via radio resource control signaling, multiple autonomous uplink transmission configurations available to the UE for autonomous uplink transmissions, each of the multiple autonomous uplink transmission configurations being associated with an aggregation factor;
select an autonomous uplink transmission configuration of the multiple autonomous uplink transmission configurations; and
transmit the autonomous uplink transmissions in accordance with the autonomous uplink transmission configuration, wherein each of the autonomous uplink transmissions are transmitted to avoid use of an orphan symbol, wherein the orphan symbol is a single and only symbol of a multi-symbol transport block assigned to a slot.

5. The apparatus of claim 4, wherein the instructions to select the autonomous uplink transmission configuration are executable by the processor to cause the apparatus to:
select the autonomous uplink transmission configuration based at least in part on a transport block size, a modulation and coding scheme, a starting symbol for the autonomous uplink transmissions, or combinations thereof.

6. An apparatus for wireless communications at a base station, comprising: a processor, memory coupled with the processor; and instructions stored in the memory and executable by the processor to cause the apparatus to:
transmit via radio resource control signaling, multiple autonomous uplink transmission configurations available to a user equipment (UE) for autonomous uplink transmissions, each of the multiple autonomous uplink transmission configurations being associated with an aggregation factor; and
receive the autonomous uplink transmissions in accordance with an autonomous uplink transmission configuration of the multiple autonomous uplink transmission configurations selected by the UE, wherein each of the autonomous uplink transmissions avoid use of an orphan symbol, wherein the orphan symbol is a single and only symbol of a multi-symbol transport block assigned to a slot.

7. The method of claim 1, wherein transmitting the autonomous uplink transmissions in accordance with the selected autonomous uplink transmission configuration comprises:
transmitting the autonomous uplink transmissions such that a first symbol of each autonomous uplink transmission is transmitted only at predefined symbol locations within a slot or mini-slot, wherein the predefined symbol locations are associated with a length of one or more mini-slots.

8. The method of claim 1, further comprising:
identifying a demodulation reference signal configuration to be used in association with transmitting the autonomous uplink transmissions, wherein the demodulation reference signal configuration is associated with the aggregation factor of the autonomous uplink transmission configuration.

9. The method of claim 8, wherein identifying the demodulation reference signal configuration comprises:
determining the demodulation reference signal configuration based at least in part on the aggregation factor.

10. The method of claim 3, wherein receiving the autonomous uplink transmissions in accordance with the autonomous uplink transmission configuration of the multiple autonomous uplink transmission configurations selected by the UE comprises:
receiving the autonomous uplink transmissions such that a first symbol of each autonomous uplink transmission is received only at predefined symbol locations within a slot or mini-slot, wherein the predefined symbol locations are associated with a length of one or more mini-slots.

11. The method of claim 3, further comprising:
identifying a demodulation reference signal configuration to be used in association with receiving the autonomous uplink transmissions, wherein the demodulation reference signal configuration is associated with the aggregation factor of the autonomous uplink transmission configuration.

12. The method of claim 11, wherein identifying the demodulation reference signal configuration comprises:
determining the demodulation reference signal configuration based at least in part on the aggregation factor.

13. The apparatus of claim 4, wherein the instructions to transmit the autonomous uplink transmissions in accordance with the autonomous uplink transmission configuration are executable by the processor to cause the apparatus to:
transmit the autonomous uplink transmissions such that a first symbol of each autonomous uplink transmission is transmitted only at predefined symbol locations within a slot or mini-slot, wherein the predefined symbol locations are associated with a length of one or more mini-slots.

14. The apparatus of claim 4, wherein the instructions are further executable by the processor to cause the apparatus to:
identify a demodulation reference signal configuration to be used in association with transmitting the autonomous uplink transmissions, wherein the demodulation reference signal configuration is associated with the aggregation factor of the autonomous uplink transmission configuration.

15. The apparatus of claim 14, wherein the instructions to identify the demodulation reference signal configuration are further executable by the processor to cause the apparatus to:
determine the demodulation reference signal configuration based at least in part on the aggregation factor.

16. The apparatus of claim 6, wherein the instructions to receive the autonomous uplink transmissions in accordance with the autonomous uplink transmission configuration of the multiple autonomous uplink transmission configurations selected by the UE are further executable by the processor to cause the apparatus to:
receive the autonomous uplink transmissions such that a first symbol of each autonomous uplink transmission is received only at predefined symbol locations within a slot or mini-slot, wherein the predefined symbol locations are associated with a length of one or more mini-slots in the slot.

17. The apparatus of claim 6, wherein the instructions are further executable by the processor to cause the apparatus to:
identify a demodulation reference signal configuration to be used in association with receiving the autonomous uplink transmissions, wherein the demodulation reference signal configuration is associated with the aggregation factor of the autonomous uplink transmission configuration.

18. The apparatus of claim 17, wherein the instructions to identify the demodulation reference signal configuration are further executable by the processor to cause the apparatus to:
determine the demodulation reference signal configuration based at least in part on the aggregation factor.

19. The method of claim 1, wherein each autonomous uplink transmission comprises multiple symbols.

20. The method of claim 3, wherein each autonomous uplink transmission comprises multiple symbols.

21. The apparatus of claim 4, wherein each autonomous uplink transmission comprises multiple symbols.

22. The apparatus of claim 6, wherein each autonomous uplink transmission comprises multiple symbols.

23. The method of claim 1, wherein transmitting the autonomous uplink transmissions includes:
transmitting the autonomous uplink transmissions in accordance with the selected configuration to indicate that the aggregation factor associated with the selected configuration is to be used for the autonomous uplink transmissions.

24. The method of claim 3, wherein receiving the autonomous uplink transmissions includes:
receiving the autonomous uplink transmissions in accordance with the selected configuration to determine that the aggregation factor associated with the selected configuration is to be used for the autonomous uplink transmissions.

25. The apparatus of claim 4, wherein the instructions to transmit the autonomous uplink transmissions are executable by the processor to cause the apparatus to:
transmit the autonomous uplink transmissions in accordance with the selected configuration to indicate that the aggregation factor associated with the selected configuration is to be used for the autonomous uplink transmissions.

26. The apparatus of claim 6, wherein the instructions to receive the autonomous uplink transmissions are executable by the processor to cause the apparatus to:
receive the autonomous uplink transmissions in accordance with the selected configuration to determine that the aggregation factor associated with the selected configuration is to be used for the autonomous uplink transmissions.

* * * * *